US012035785B2

(12) United States Patent
Weng et al.

(10) Patent No.: US 12,035,785 B2
(45) Date of Patent: Jul. 16, 2024

(54) MAGNETIC BUCKLE DEVICE

(71) Applicant: Renny Tse-Haw Ling, Taipei (TW)

(72) Inventors: Chia-Wei Weng, Taipei (TW); Kuo-Kuang Pan, Taipei (TW); Yueh-Cheng Huang, Taipei (TW)

(73) Assignee: Renny Tse-Haw Ling, Taipei (TW)

(*) Notice: Subject to any disclaimer, the term of this patent is extended or adjusted under 35 U.S.C. 154(b) by 96 days.

(21) Appl. No.: 17/585,897

(22) Filed: Jan. 27, 2022

(65) Prior Publication Data

US 2022/0248809 A1 Aug. 11, 2022

(30) Foreign Application Priority Data

Feb. 8, 2021 (TW) ................................ 110104744
May 14, 2021 (TW) ................................ 110117405

(51) Int. Cl.
*E05B 65/52* (2006.01)
*A44B 11/25* (2006.01)
*E05B 47/00* (2006.01)

(52) U.S. Cl.
CPC ............ *A44B 11/25* (2013.01); *E05B 47/004* (2013.01); *E05B 65/5246* (2013.01)

(58) Field of Classification Search
CPC ............... E05B 65/5246; E05B 47/004; E05B 47/0038; E05B 17/2034; E05B 37/0031; E05B 37/0034; E05B 15/0073; A44D 2203/00
See application file for complete search history.

(56) References Cited

U.S. PATENT DOCUMENTS 3,325,869 A * 6/1967 Younger .............. A44B 19/301 24/387
4,919,464 A * 4/1990 Richards ............. E05B 47/0038 292/201
5,035,451 A * 7/1991 Brady ..................... E05C 19/10 292/201
5,689,979 A * 11/1997 Yu ....................... E05B 65/5261 70/68

(Continued)

FOREIGN PATENT DOCUMENTS

CN 101218407 A 7/2008
CN 103957739 A 7/2014

(Continued)

*Primary Examiner* — Kristina R Fulton
*Assistant Examiner* — Emily G. Brown
(74) *Attorney, Agent, or Firm* — Best & Flanagan LLP

(57) ABSTRACT

A magnetic buckle device has a first base, a major inserting head, a second major base, two major components, and a controlling assembly. The major inserting head can be inserted into the first base to engage and lock. The second major base and the first base can be moved or rotated with respect to each other such that the major inserting head enters a disengaging state. The two major components are respectively mounted on the second major base and the major inserting head. When the major inserting head is close to a major insertion hole of the first base, a magnetic force is generated between the two major components to guide the major inserting head to close the major insertion hole and assist the major inserting head in inserting. After the major inserting head is inserted, the magnetic force also assists the major inserting head in staying in the engaging state.

14 Claims, 43 Drawing Sheets

(56) References Cited

U.S. PATENT DOCUMENTS

| | | | | | |
|---|---|---|---|---|---|
| 5,927,110 | A * | 7/1999 | Yu | E05B 37/12 70/68 |
| 6,202,455 | B1 * | 3/2001 | Su | E05B 37/12 70/68 |
| 7,234,739 | B2 * | 6/2007 | Saitoh | E05C 19/163 292/251.5 |
| 9,555,935 | B2 | 1/2017 | Fiedler | |
| 10,212,993 | B2 * | 2/2019 | Fiedler | A44B 11/2588 |
| 11,261,621 | B2 * | 3/2022 | Lai | E05B 37/02 |
| 11,384,570 | B2 | 7/2022 | Song | |
| 2008/0060400 | A1 | 3/2008 | Ling et al. | |
| 2009/0106951 | A1 * | 4/2009 | Edwards | A44B 19/301 24/399 |
| 2013/0036778 | A1 | 2/2013 | Lai | |
| 2015/0014109 | A1 | 1/2015 | Lai | |
| 2020/0154804 | A1 * | 5/2020 | Huang | A44B 11/28 |
| 2021/0317683 | A1 | 10/2021 | Zhang et al. | |
| 2021/0317686 | A1 | 10/2021 | Yu et al. | |

FOREIGN PATENT DOCUMENTS

| | | | | | |
|---|---|---|---|---|---|
| CN | 103993789 | A | | 8/2014 | |
| CN | 205502774 | U | | 8/2016 | |
| CN | 107489315 | A | * | 12/2017 | E05B 37/0034 |
| CN | 208152781 | U | | 11/2018 | |
| CN | 210508725 | U | | 5/2020 | |
| CN | 112012584 | A | | 12/2020 | |
| CN | 112211507 | A | | 1/2021 | |
| CN | 212295958 | U | | 1/2021 | |
| DE | 202019101103 | U1 | | 5/2019 | |
| DE | 212020000355 | U1 | | 1/2021 | |
| JP | 5108135 | B1 | | 12/2012 | |
| JP | 2015086561 | A | | 5/2015 | |
| JP | 2018164494 | A | | 10/2018 | |
| JP | 3238087 | U | | 1/2021 | |
| WO | WO2021004457 | A1 | | 1/2021 | |

* cited by examiner

MAGNETIC BUCKLE DEVICE

BACKGROUND OF THE INVENTION

1. Field of the Invention

The present invention relates to a buckle device, especially to a buckle device that is utilized to a bag, a backpack, a suitcase, etc. The buckle device is detachably connected to two parts and has a lock to control the engagement.

2. Description of the Prior Arts

Conventionally, bags or suitcases are opened or closed via a zipper. Some of them (especially a suitcase) have a buckle device. The zipper head of the zipper may be inserted into the buckle device such that the zipper head is fixed and cannot be moved, thereby locking the suitcase.

However, the conventional buckle device has the following defects: to insert the zipper head into the buckle device, the user has to align the zipper head with an insertion hole of the buckle device, then presses the zipper head into the insertion hole of the buckle device with adequate force, which is not convenient. Especially, when the user wants to lock a suitcase, the user's hands may be occupied or may not be free, and thus the buckle device is hard to be locked.

Besides, some bags or cases (e.g. suitcases) have a zipper with two zipper heads. If the two zipper heads are inserted into the buckle device, the suitcase cannot be opened. In fact, the locations on the buckle device for insertion of the two zipper heads are very close to facilitate inserting and locking. However, because the locations are too close, during the unlocking, the user cannot catch any one of the zipper heads, which is not convenient.

To overcome the shortcomings, the present invention provides a magnetic buckle device to mitigate or obviate the aforementioned problems.

SUMMARY OF THE INVENTION

The main objective of the present invention is to provide a magnetic buckle device that can be engaged and locked more easily.

The magnetic buckle device has a first base, a major inserting head, a second major base, a first major component, and a second major component. The major inserting head is configured to be inserted into the first base along a major engaging direction such that the major inserting head enters an engaging state. The first base and the second major base are capable of being moved or rotated with respect to each other such that the major inserting head is changed to a disengaging state. The first major component is mounted on the second major base. The second major component is mounted on the major inserting head. When the major inserting head is inserted into the first base along the major engaging direction, a magnetic attracting force is generated between the first major component and the second major component to assist the major inserting head in staying in the engaging state.

Therefore, when the major inserting head is close to a major insertion hole of the first base, the magnetic attraction force between the second major component on the major inserting head and the first major component of the second major base in the first base may guide the major inserting head. Therefore, the major inserting head may be closer to the major insertion hole of the first base and facilitate insertion of the major inserting head. In other words, said magnetic attraction force assists in inserting the major inserting head. After the major inserting head is inserted to a predetermined position, the magnetic attraction force between the two major components can assist in keeping the present invention in the engaging state. Therefore, the present invention does not need more engagement structures and saves the effort of the user, or even the user may not use any effort but positions and engages the magnetic buckle device via the magnetic attraction force. With the magnetic attraction force provided by the two major components, the major inserting head is guided for insertion, and the user may use less force, which improves the convenience.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
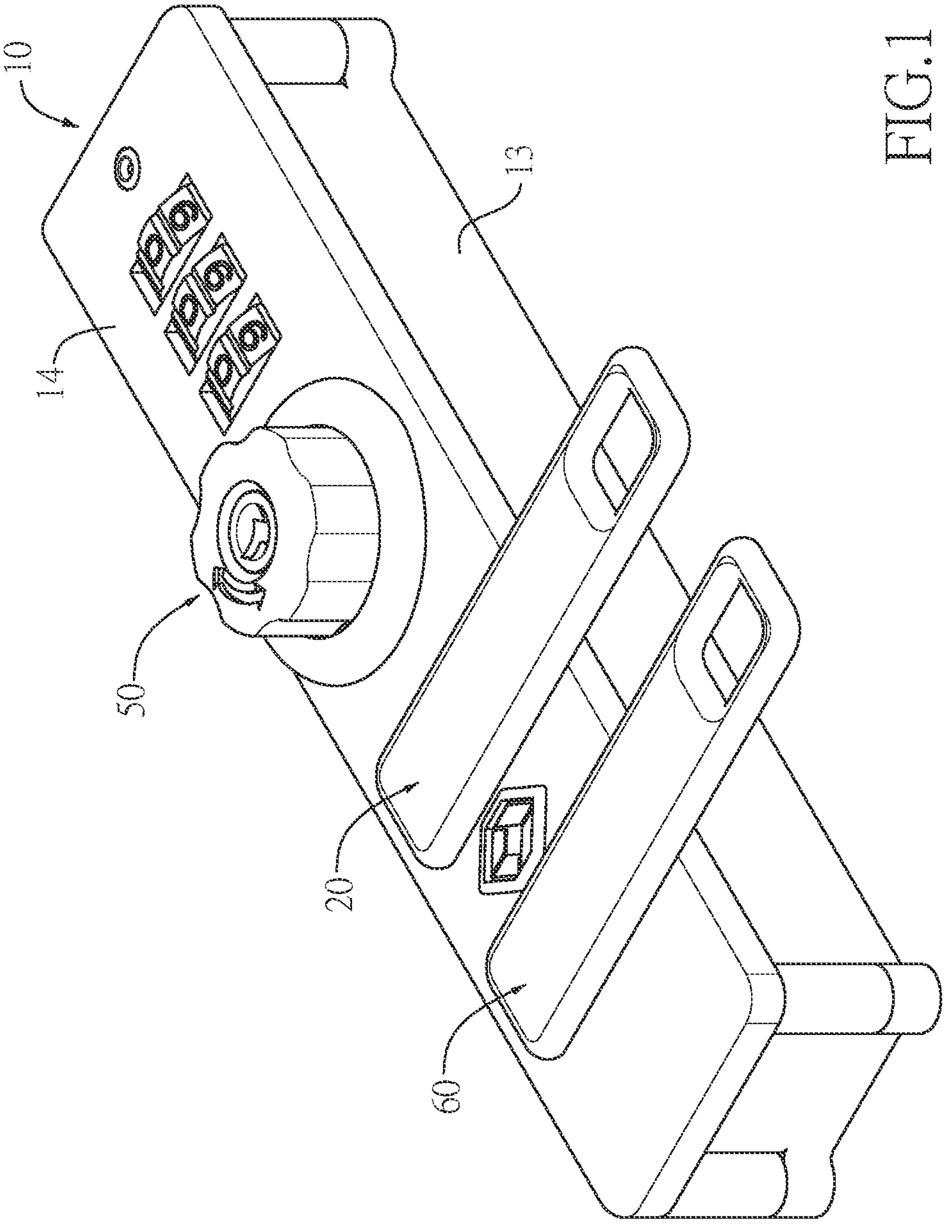
FIG. 1 is a perspective view of a magnetic buckle device in accordance with a first embodiment of the present invention.
Figure 2:
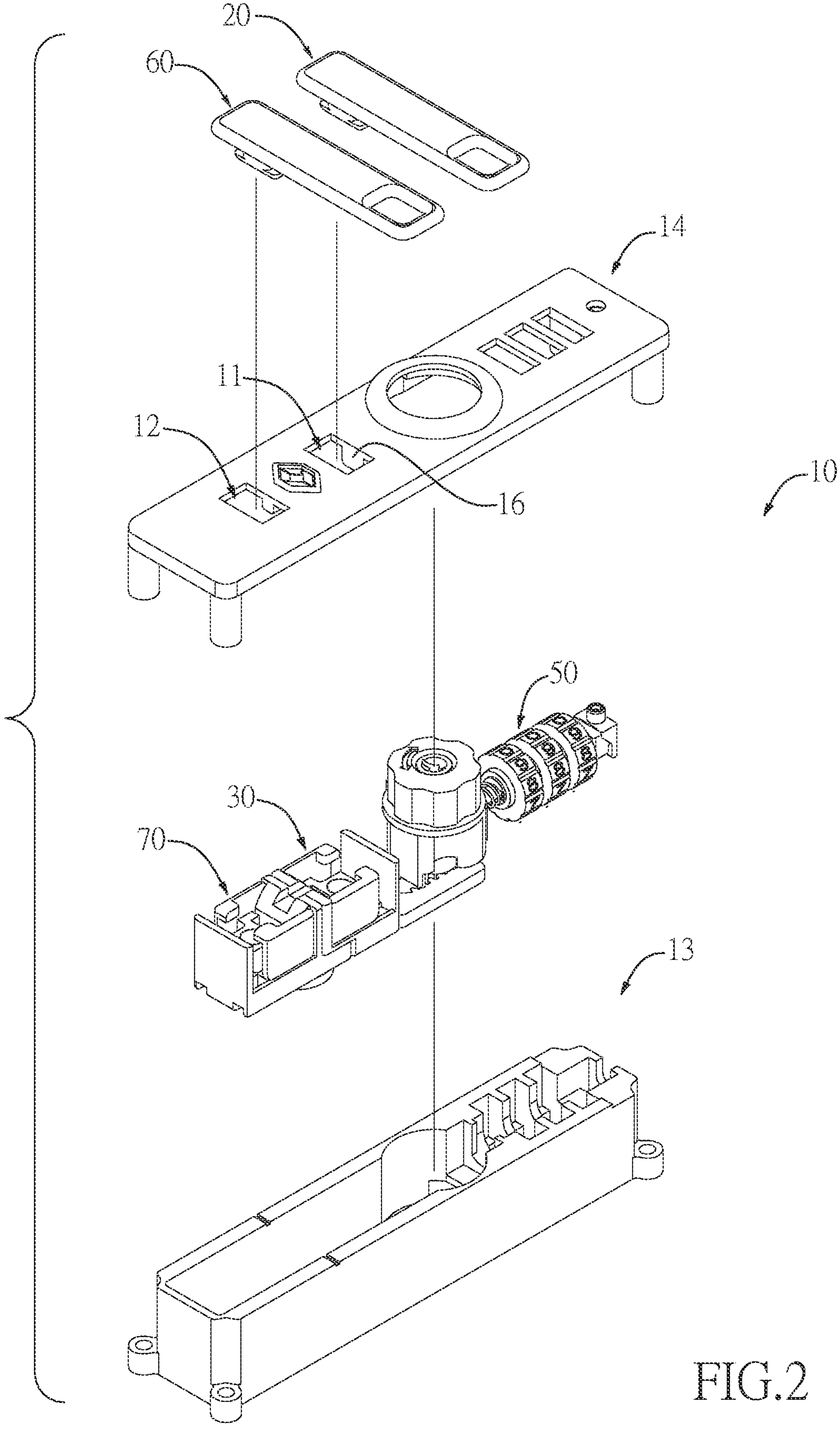
FIGS. 2 to 4 are exploded views of the magnetic buckle device in FIG. 1.
Figure 7:
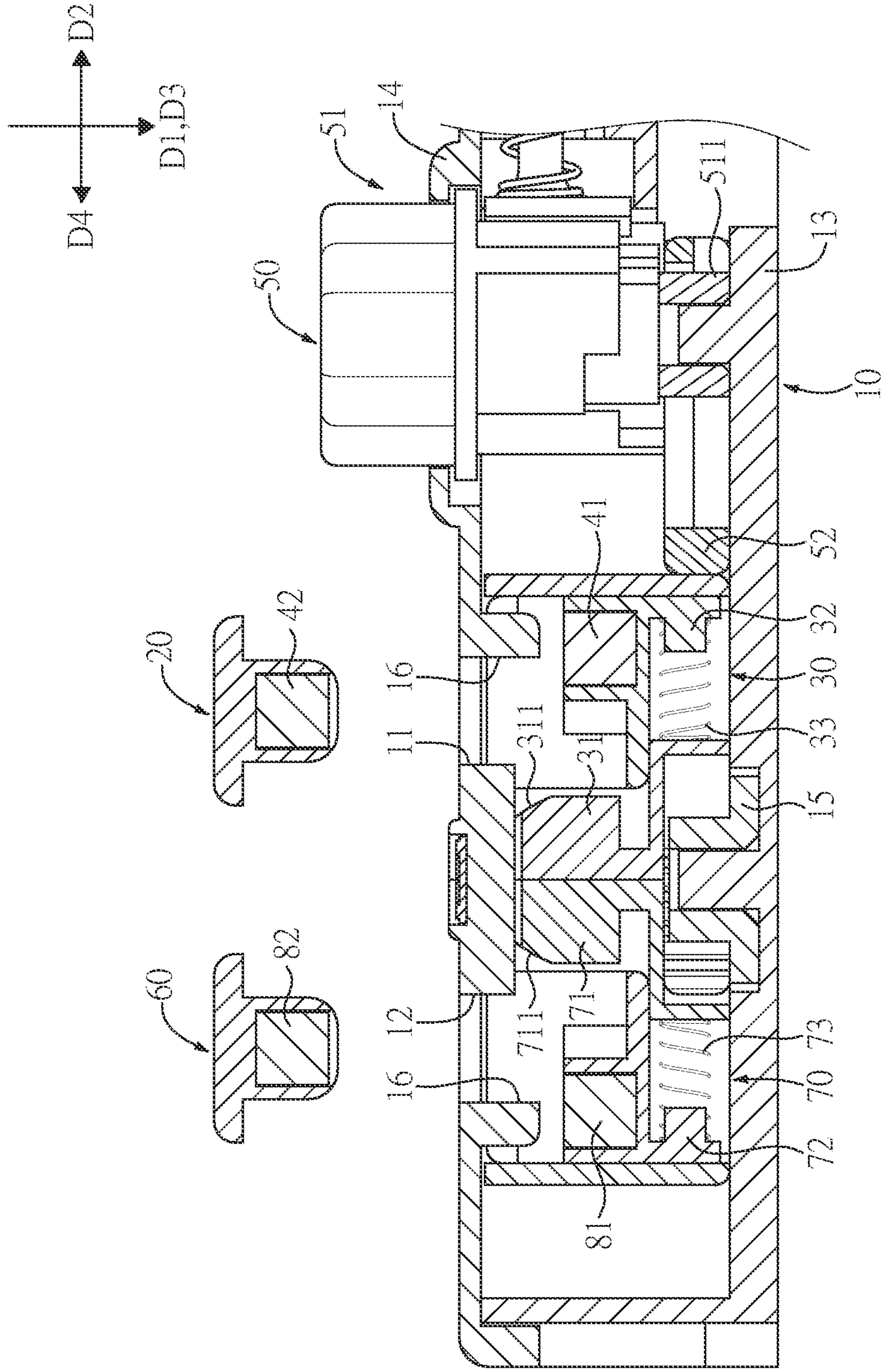
FIGS. 7 to 10 are front, sectional, and operational views of the magnetic buckle device in FIG. 1.

With reference to FIG. 1, FIG. 2, and FIG. 7, a magnetic buckle device in accordance with the present invention is provided and comprises a first base 10, a major inserting head 20, a second major base 30, a first major component 41, a second major component 42, and a controlling assembly 50, and preferably further comprises a minor inserting head 60, a second minor base 70, a first minor component 81, and a second minor component 82. In other words, the magnetic buckle device may only have one inserting head (i.e. the major inserting head 20) and relevant components, or may have two inserting heads (i.e. the major inserting head 20 and the minor inserting head 60) and relevant components.

With reference to FIG. 1 and FIG. 2, the first base 10 and the major inserting head 20 are configured to be connected with two articles that are to be connected with each other. The first base 10 and the minor inserting head 60 are also configured to be connected with two articles that are to be connected with each other. For example, the first base 10 may be a locking device mounted on a suitcase or a bag, and the major inserting head 20 and the minor inserting head 60 may be zipper heads of a zipper. Preferably, the controlling assembly 50 may be any kind of lock, e.g. a combination lock, a key lock, or a lock that can be unlocked by both a key and a code such that the controlling assembly 50 is configured to control the suitcase to open or close. However, it is not limited thereto, and the controlling assembly 50 may not be a lock as long as it is capable of driving the major inserting head 20 and the minor inserting head 60 to move out and disengage. Besides, the invention can be utilized in other various fields rather than in the suitcase field only.

The first base 10 is preferably a shell and has an inner space, a major insertion hole 11, and a minor insertion hole 12. In this embodiment, the major insertion hole 11 and the minor insertion hole 12 are formed on a top surface of the first base 10. Besides, in this embodiment, the controlling assembly 50 is mounted in the first base 10, so the first base 10 has an opening and thus the controlling assembly 50 is exposed via said opening. It is not limited thereto, and the controlling assembly 50 may be mounted out of the first base 10 and extend into the first base 10 to drive the components in the first base 10. Moreover, in this embodiment, the first base 10 comprises a bottom part 13 and an upper lid 14, but it is not limited thereto.

Figure 8:
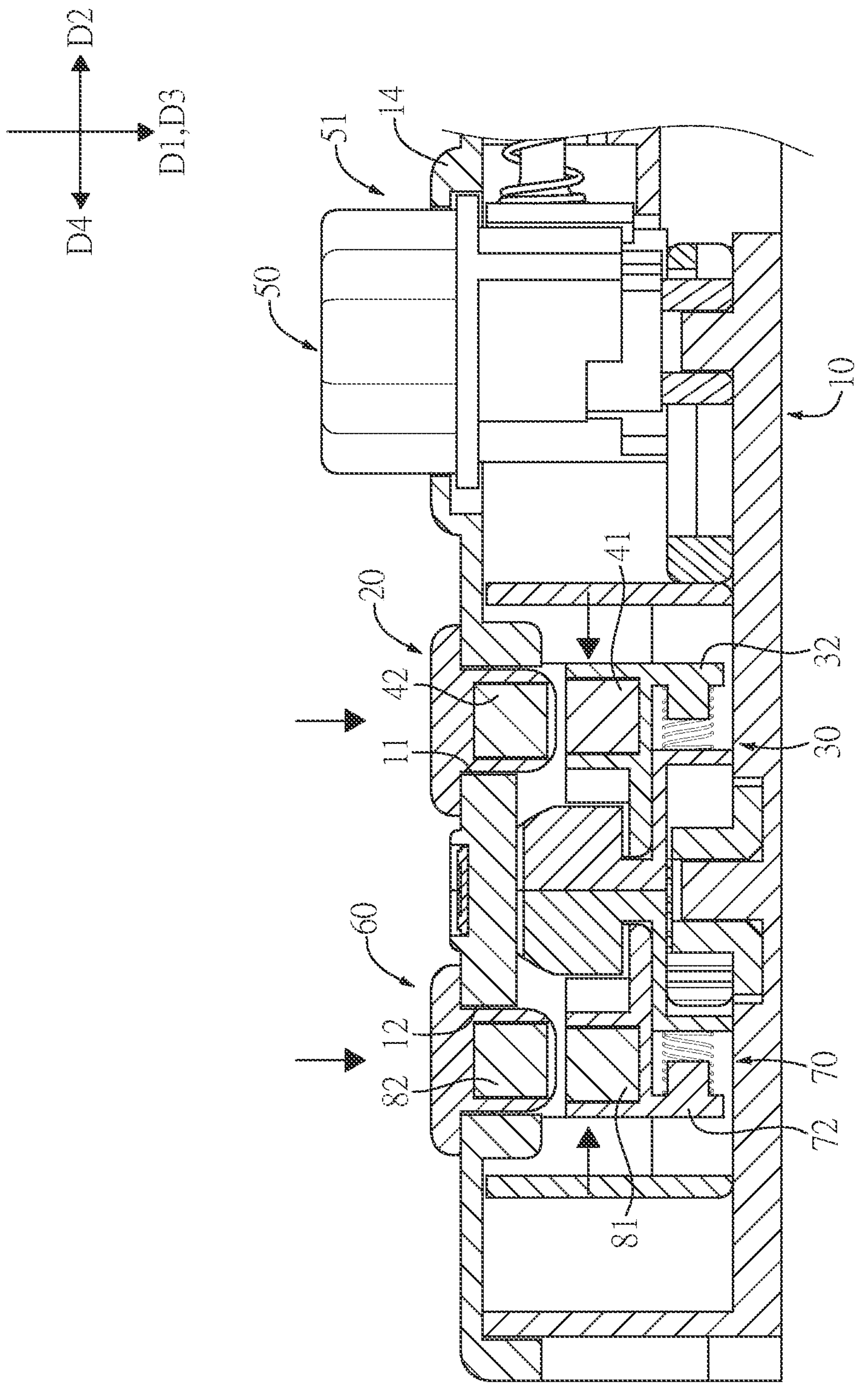
Figure 9:
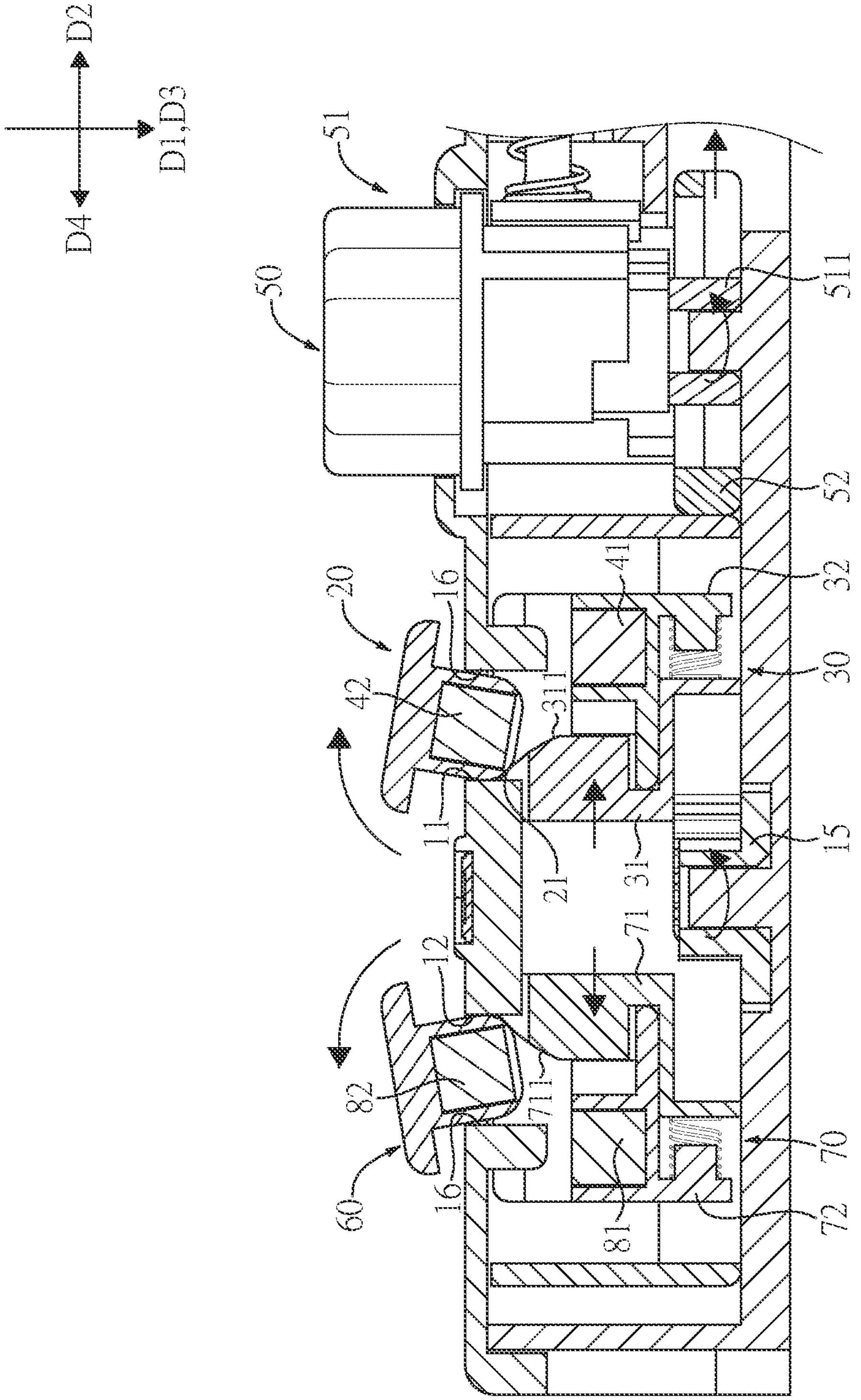
Figure 10:
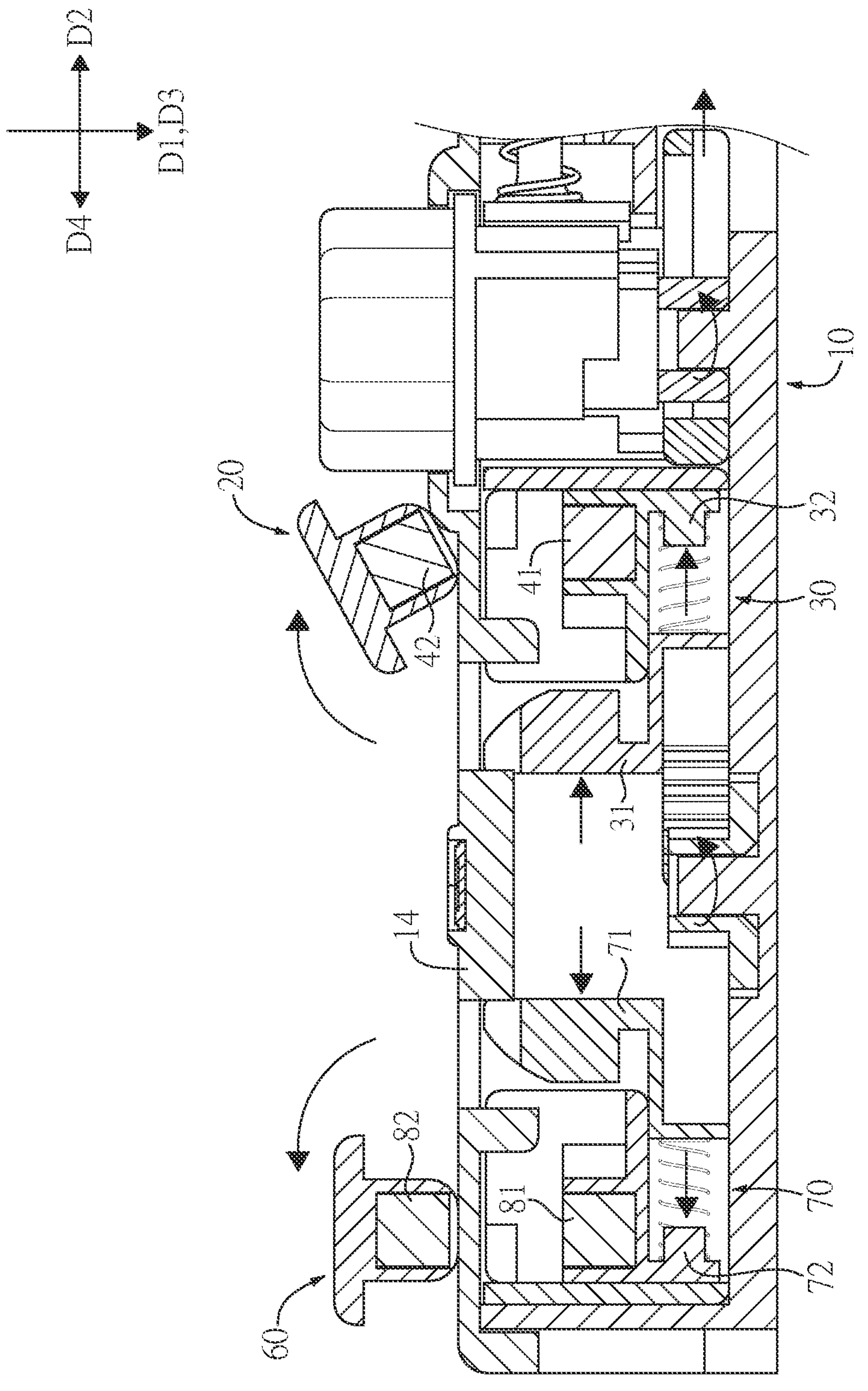

Please refer to FIG. 7 to FIG. 10. The major inserting head 20 can be inserted into the first base 10 along a major engaging direction D1 and through the major insertion hole 11 such that the major inserting head 20 enters an engaging state (as shown in FIG. 8). The engaging state here means the major inserting head 20 cannot be separated from the first base 10, the second major base 30 is movably mounted in the first base 10, and the second major base 30 can be moved with respect to the first base 10 along a major disengaging direction D2 such that the major inserting head 20 can enter a disengaging state. Preferably, in the disengaging state, the major inserting head 20 is capable of being separated from the first base 10 (as shown in FIG. 10), but not restricted thereto; at least, the major inserting head 20 disengages from the first base 10 but is not moved out of the first base 10. The major disengaging direction D2 differs from the major engaging direction D1, and preferably, the major disengaging direction D2 is perpendicular to the major engaging direction D1, but it is not limited thereto.

The minor inserting head 60 can be inserted into the first base 10 along a minor engaging direction D3 and through the minor insertion hole 12 such that the minor inserting head 60 enters an engaging state (as shown in FIG. 8). The engaging state here means the minor inserting head 60 cannot be separated from the first base 10, the second minor base 70 is movably mounted in the first base 10, and the second minor base 70 can be moved with respect to the first base 10 along a minor disengaging direction D4 such that the minor inserting head 60 can enter a disengaging state. Preferably, in the disengaging state, the minor inserting head 60 is capable of being separated from the first base 10 (as shown in FIG. 10), but not restricted thereto; at least, the minor inserting head 60 disengages from the first base 10 but is not moved out of the first base 10. The minor disengaging direction D4 differs from the minor engaging direction D3, and preferably, the minor disengaging direction D4 is perpendicular to the minor engaging direction D3, but it is not limited thereto.

In this embodiment, the major engaging direction D1 of the major inserting head 20 and the minor engaging direction D3 of the minor inserting head 60 are the same. In other words, the major inserting head 20 and the minor inserting head 60 are inserted from the top surface of the first base 10; but it is not limited thereto, and the major inserting head 20 and the minor inserting head 60 may be inserted into the first base 10 along other directions. In this embodiment, the major disengaging direction D2 and the minor disengaging direction D4 are opposite to each other; but it is not limited thereto, and the major disengaging direction D2 and the minor disengaging direction D4 may be the same direction.

In the aforesaid embodiment, both the second major base 30 and the second minor base 70 are mounted through and into the first base 10 configured to push the second major base 30 and the second minor base 70 to enter the disengaging state; but it is not limited thereto, and the second major base 30 and the second minor base 70 may not be mounted through and in the first base 10. For example, the second major base 30 and the second minor base 70 may be mounted on a side surface of the first base 10. In another embodiment, the first base 10 may be pushed to move with respect to the second major base 30 and the second minor base 70 such that the second major base 30 and the second minor base 70 enter the disengaging state.

In the aforesaid embodiment, the second major base 30 and the second minor base 70 are capable of being moved with respect to the first base 10; but it is not limited thereto, as long as they are rotatable with respect to each other. Precisely, the second major base 30 and the second minor base 70 may be rotated with respect to the first base 10, or the first base 10 may be rotated with respect to the second major base 30 and the second minor base 70.

Please refer to FIG. 3, FIG. 4, FIG. 7, and FIG. 8. The first major component 41 is mounted on the second major base 30 and the second major component 42 is mounted on the major inserting head 20. When the major inserting head 20 is close to the major insertion hole 11 of the first base 10, a magnetic attraction force for guiding is generated between the second major component 42 on the major inserting head 20 and the first major component 41 in the second major base 30, which attracts the major inserting head 20 close to the major insertion hole 11 of the first base 10 and facilitate insertion of the major inserting head 20 into the major insertion hole 11. In other words, said magnetic attraction force assists in inserting the major inserting head 20. Then, when the major inserting head 20 is inserted to a predetermined position, another magnetic attraction force generated between the two major components 41, 42 can assist in keeping the major inserting head 20 in the engaging state. One of the two major components 41, 42 may be a magnet and the other one is metal or both of the two major components 41, 42 are magnets, as long as the magnetic attraction force is generated therebetween. In this embodiment, the first major component 41 is mounted in the second major base 30, and even if the major inserting head 20 is inserted to the predetermined position, the first major component 41 and the second major component 42 are still spaced apart from each other; but it is not limited thereto.

Please refer to FIG. 3, FIG. 4, FIG. 7, and FIG. 8. The first minor component 81 is mounted on the second minor base 70 and the second minor component 82 is mounted on the minor inserting head 60. When the minor inserting head 60 is close to the minor insertion hole 12 of the first base 10, a magnetic attraction force for guiding is generated between the second minor component 82 on the minor inserting head 60 and the first minor component 81 in the first base 10, which attracts the minor inserting head 60 close to the minor insertion hole 12 of the first base 10 and facilitates insertion of the minor inserting head 60 in the minor insertion hole 12. In other words, said magnetic attraction force assists in inserting the minor inserting head 60. Then, when the minor inserting head 60 is inserted to a predetermined position, another magnetic attraction force generated between the two minor components 81, 82 can assist in keeping the minor inserting head 60 in the engaging state. One of the two minor components 81, 82 may be a magnet and the other one is metal or both of the two minor components 81, 82 are magnets, as long as the magnetic attraction force is generated therebetween. In this embodiment, the first minor component 81 is mounted in the second minor base 70, and even if the minor inserting head 60 is inserted to the predetermined position, the first minor component 81 and the second minor component 82 are still spaced apart from each other; but it is not limited thereto.

Besides, each one of the first major component 41, the second major component 42, the first minor component 81, and the second minor component 82 may be an individual component or may be formed integrally with the corresponding component where it is mounted. For example, the first major component 41 may be formed integrally with the second major base 30 and the second major base 30 is made of magnet or metal; the second minor component 82 may be formed integrally with the minor inserting head 60 and the minor inserting head 60 is made of magnet or metal.

Figure 4:
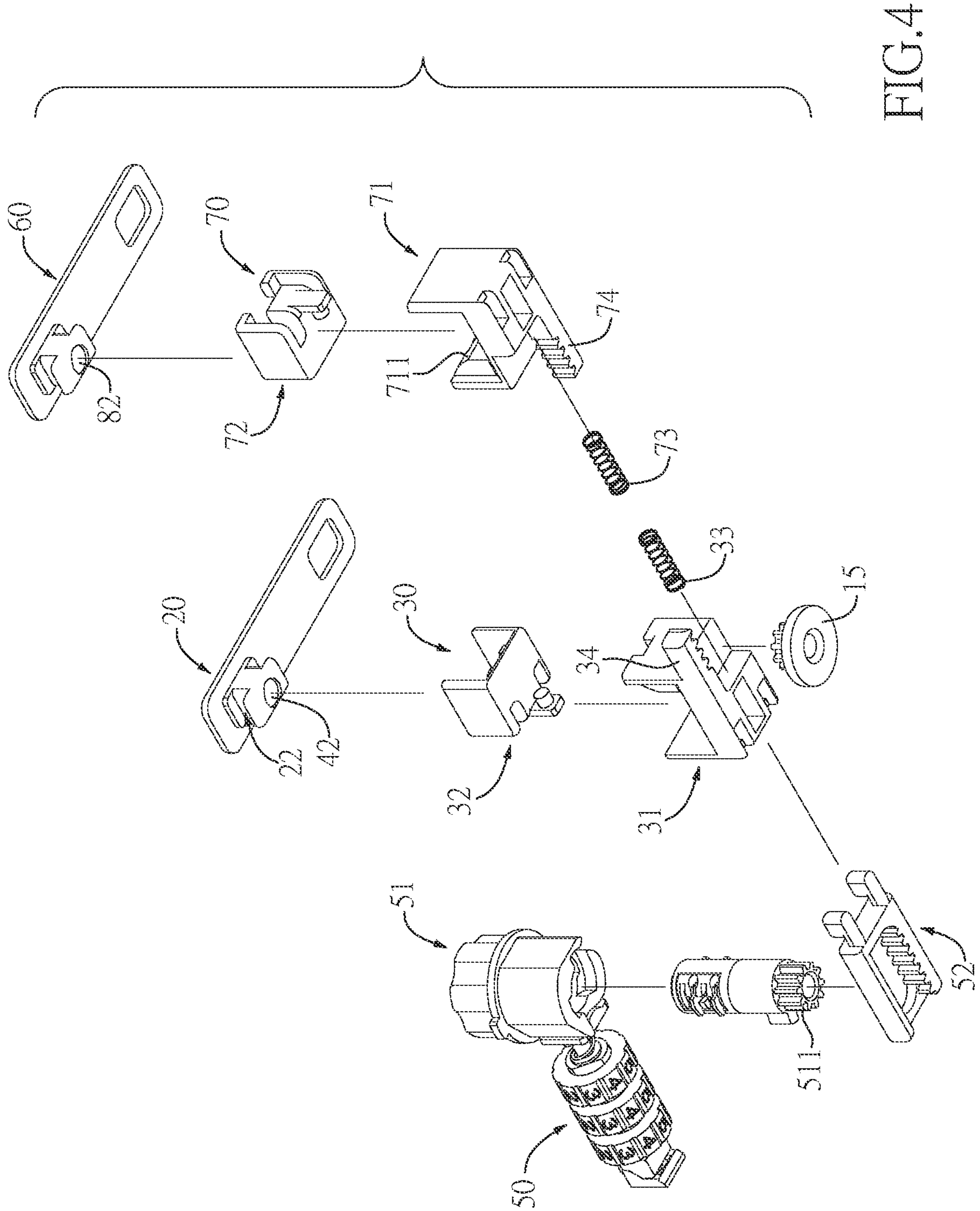
Figure 5:
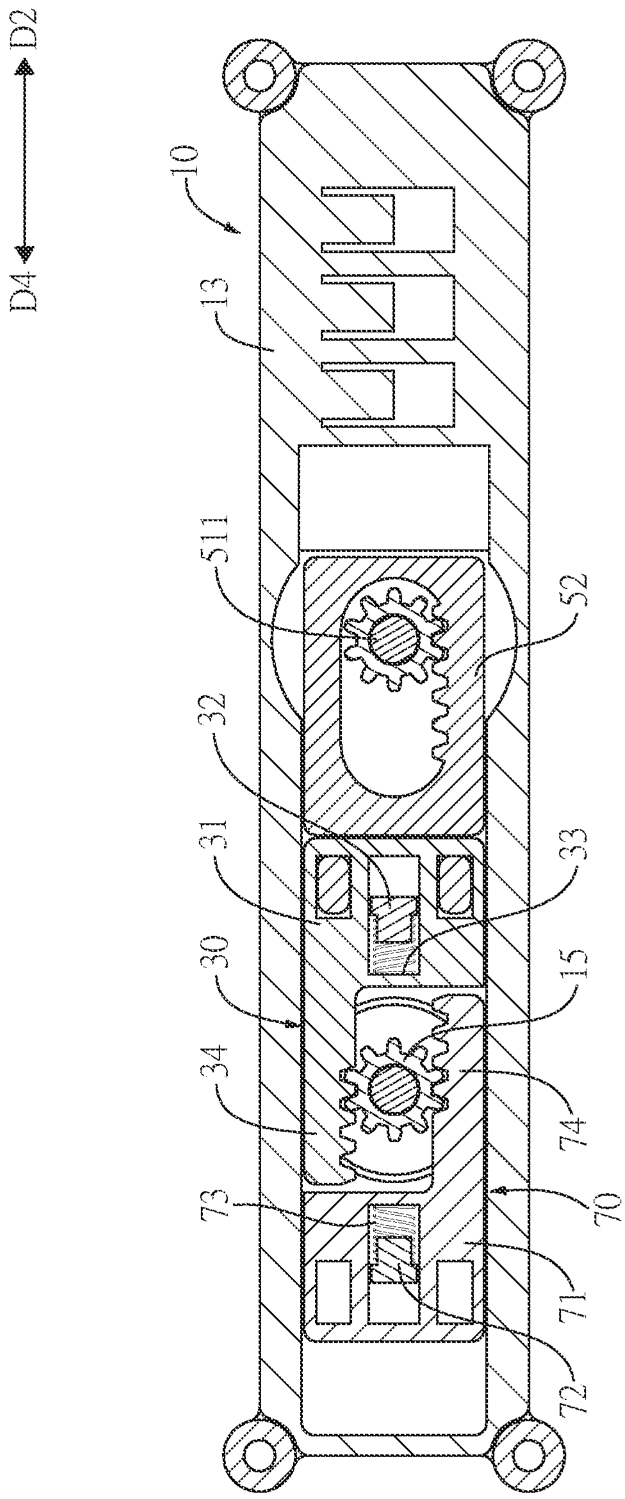
FIGS. 5 and 6 are top, sectional, and operational views of the magnetic buckle device in FIG. 1.
Figure 6:
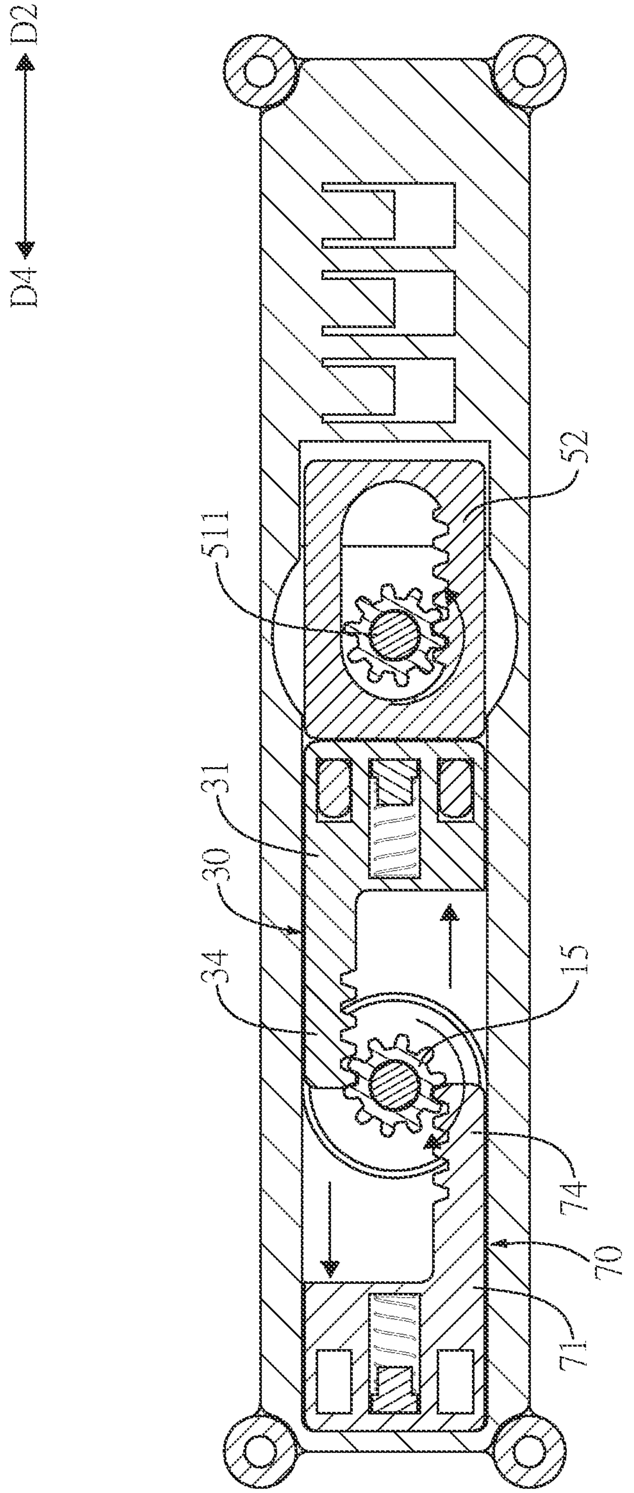

Please refer to FIG. 4 to FIG. 6. The movement that the second major base 30 pushes out the major inserting head 20 may drive the second minor base 70 to move with respect to the first base 10 such that the minor inserting head 60 is moved out of the first base 10. If the minor disengaging direction D4 is opposite the major disengaging direction D2, in a preferred embodiment, the second major base 30 has a major rack 34 protruding toward the second minor base 70 and the second minor base 70 has a minor rack 74 protruding toward the second major base 30. A gear 15 is disposed between the major rack 34 and the minor rack 74 and engage with both the major rack 34 and the minor rack 74. Since the major rack 34 and the minor rack 74 are located on two opposite sides of the gear 15, if the gear 15 is turned, the major rack 34 and the minor rack 74 are driven by the gear 15 to move toward opposite directions. However, the mechanism that the second major base 30 drives the second minor base 70 is not limited thereto. Besides, in another embodiment that the minor disengaging direction D4 and the major disengaging direction D2 are the same direction, the second major base 30 and the second minor base 70 may be directly connected with each other or even formed integrally.

The controlling assembly 50 may selectively prevent the second major base 30 and the first base 10 from moving or rotating with respect to each other, thereby preventing the major inserting head 20 from entering the disengaging state. Further, as the second major base 30 and the first base 10 are prevented from moving or rotating with respect to each other, the second minor base 70 is restricted by the second major base 30 such that the second minor base 70 and the first base 10 cannot be moved or rotated with respect to each other, thereby preventing the minor inserting head 60 from entering the disengaging state. Thus, the controlling assembly 50 indirectly controls the state of the minor inserting head 60. However, it is not limited thereto, and the controlling assembly 50 may directly contact the second minor base 70 to directly and selectively prevent the second minor base 70 and the first base 10 from moving or rotating with respect to each other, thereby preventing the minor inserting head 60 from entering the disengaging state. The major inserting head 20 and the second major base 30 may be two individual components and be defined as a set, and the minor inserting head 60 and the second minor base 70 may be two individual components and be defined as another set, too. The controlling assembly 50 is configured to control the two sets at the same time. In this embodiment, the controlling assembly 50 selectively prevents the second major base 30 from being moved out of the major inserting head 20 along the major disengaging direction D2. When the second major base 30 is restricted by the controlling assembly 50 and cannot be moved out of the major inserting head 20, the second minor base 70 is also restricted by the second major base 30 and thus cannot be moved with respect to the first base 10, which causes the minor inserting head 60 unable to be moved out. However, it is not limited thereto. In another embodiment, the controlling assembly 50 may directly contact the second minor base 70, so selectively but directly prevents the second minor base 70 from being moved with respect to the first base 10 along the minor disengaging direction D4 and causing the minor inserting head 60 to be moved out.

In a preferred embodiment, the controlling assembly 50 is connected to the second major base 30 and configured to control the second major base 30 to move along the major disengaging direction D2 and along a direction opposite the major disengaging direction D2. In other words, the controlling assembly 50 is capable of moving the second major base 30 forward and backward. It is not limited thereto, as the controlling assembly 50 may only prevent the second major base 30 from being moved along the major disengaging direction D2, and the second major base 30 is moved by another way or another component.

Please refer to FIG. 4 to FIG. 7. In the embodiment that the controlling assembly 50 can move the second major base 30 forward and backward, preferably, the controlling assembly 50 comprises a locking core 51 and a transmitting component 52. The transmitting component 52 is connected to the second major base 30 and configured to move the second major base 30 along the major disengaging direction D2 and along the direction opposite the major disengaging direction D2. The locking core 51 may be a combination lock, a key lock, or a lock that can be unlocked by both a key and a code, etc. The locking core 51 comprises a rotatable rolling output portion 511 connected to a lock that can be unlocked by both a key and a code. The locking core 51 is capable of making the transmitting component 52 move along the major disengaging direction D2 and along the direction opposite the major disengaging direction D2 through rotating the r rolling output portion 511. Preferably, the rolling output portion 511 moves the transmitting component 52 along two straight paths via gears and racks, but it is not limited thereto. In another embodiment, the locking core 51 may not drive the transmitting component 52 via rotation but moving straight instead.

Please refer to FIG. 8 to FIG. 10. When the major inserting head 20 and the minor inserting head 60 are inserted into the first base 10 thereby entering the engaging state, after the locking core 51 is unlocked and the rolling output portion 511 is rotated, the second major base 30 and the second minor base 70 are moved at the same time such that the major inserting head 20 and the minor inserting head 60 can be moved out of the first base 10.

Then the details are explained about the second major base 30 moving along the major disengaging direction D2, and thereby moving out the major inserting head 20. In addition, the function of the second minor base 70 is similar to that of the second major base 30, so the details are omitted. In other words, the details about the second minor base 70 moving along the minor disengaging direction D4 thereby moving out the minor inserting head 60 are omitted. Therefore, the movement regarding the second major base 30 and the major inserting head 20 is as follows.

Please refer to FIG. 8 to FIG. 10. In this embodiment, when the second major base 30 is pushed along the major disengaging direction D2, a reaction force is generated by the second major base 30 toward a direction opposite the major engaging direction D1 to resist the magnetic attraction force between the two major components 41, 42, such that a side 21 of the major inserting head 20 is tilted up and thus an angle between the first major component 41 and the second major component 42 is changed; the side 21 is opposite the major disengaging direction D2. At this time, the magnetic force between the two major components 41, 42 is not balanced, which makes the major inserting head 20 unstable. With the second major base 30 being pushed and moved further, the first major component 41 is moved along with the second major base 30 and the magnetic attraction force keeps attracting the unstable major inserting head 20, which generates a moment on the inclined major inserting head 20. Then, after the second major base 30 is pushed to an end of its stroke, the major inserting head 20 is moved out of the first base 10 by the moment generated by the magnetic attraction force. In other words, the push force on the second major base 30 facilitates moving the major inserting head 20 out of the first base 10. However, the process of moving out the major inserting head 20 via the second major base 30 is not limited to the aforementioned process.

More details are as follows about the movement of the second major base 30 which generates the reaction force in a direction opposite the major engaging direction D1. In this embodiment, the second major base 30 comprises a major tiling-abutting portion 311, and the major tiling-abutting portion 311 is a bump with an inclined surface, but the shape is not limited thereto. When the second major base 30 is moved along the major disengaging direction D2, the major tiling-abutting portion 311 pushes the side 21 of the major inserting head 20 toward the direction opposite the major engaging direction D1; the side 21 is opposite the major disengaging direction D2. Then, the reaction force is generated to tilt up the side 21 of the major inserting head 20 and changes the angle between the two major components 41, 42. However, it is not limited thereto, and the reaction force may be generated by other means.

In this embodiment, when the major inserting head 20 is moved along with the second major base 30 and out of the first base 10, the first major component 41 is also moved along with the second major base 30, and thus the magnetic attraction force between the first major component 41 and the second major component 42 on the major inserting head 20 generates a lateral component of force such that the major inserting head 20 is obliquely pushed out of the first base 10 (as shown in FIG. 10). Further, after being moved out of the first base 10, the major inserting head 20 is still attracted by the magnetic force between the two major components 41, 42 and thus the major inserting head 20 can abut the first base 10 (as shown in FIG. 10) toward the first major component 41. With the major inserting head 20 obliquely moved out of the first base 10, the chance to move the major inserting head 20 out of the first base 10 is enhanced, and the major inserting head 20 will not be inserted into the first base 10 by accident. It is not limited thereto, and in another embodiment, the major inserting head 20 may not be moved out obliquely, but instead, simply be moved out of the first base 10 along the direction opposite the major engaging direction D1.

Moreover, in this embodiment, as shown in FIG. 2, FIG. 9, and FIG. 10, the first base 10 comprises two stopping portions 16. Preferably, the stopping portions 16 are formed on surfaces of the major insertion hole 11 and the minor insertion hole 12 and thereby respectively obstruct the major inserting head 20 and the minor inserting head 60. When the second major base 30 is pushed along the major disengaging direction D2, the stopping portions 16 abut the major inserting head 20 to prevent the major inserting head 20 from moving along with the second major base 30 in the major disengaging direction D2. Therefore, the major inserting head 20 will not be moved immediately along with the second major base 30 after the magnetic attraction force from the first major component 41 is moved. Instead, the major inserting head 20 is pushed (for example, by the major tiling-abutting portion 311) until the side 21 is tilted up, then attracted by the magnetic attraction force to cross over the stopping portion 16 and obliquely move out of the first base 10. The major inserting head 20 is not moved synchronously but moved out completely after cumulating energy for a while, which looks like that the major inserting head 20 is popped out. In an embodiment that the major inserting head 20 is simply moved out of the first base 10 along the direction opposite the major engaging direction D1, the stopping portion 16 may be kept in the moving direction of the major inserting head 20 rather than deviated.

Please refer to FIG. 8. When the major inserting head 20 is inserted into the first base 10 along the major engaging direction D1 thereby the major inserting head 20 entering the engaging state, the first major component 41 and the second major component 42 are parallel to each other, and a centerline of the first major component 41 is perpendicular to the major disengaging direction D2. It is not limited thereto, and the centerlines of the first major component 41 and the second major component 42 may not be perpendicular to the major disengaging direction D2. In other words, the two major components 41, 42 face toward the oblique moving direction of the major inserting head 20, which assists in obliquely moving the major inserting head 20 out of the first base 10 by the magnetic attraction force.

Figure 3:
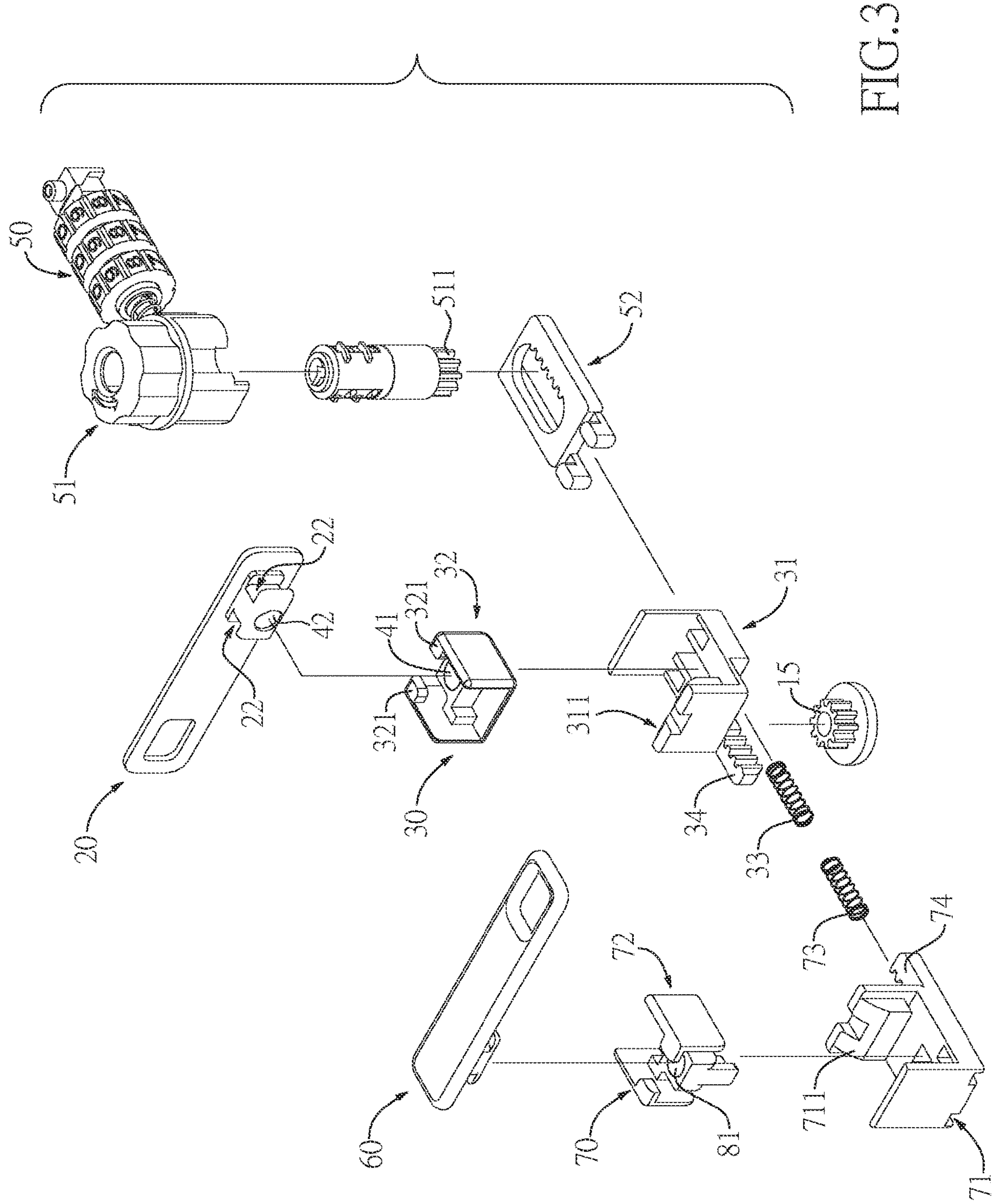

In this embodiment, as shown in FIG. 3, FIG. 4, and FIG. 7, the second major base 30 further comprises a major base body 31 and a major displacement component 32. The major base body 31 is part of the second major base 30 and said part is obstructed by or connected with the controlling assembly 50. The major rack 34 is mounted on the major base body 31 and the major tiling-abutting portion 311 is formed on the major base body 31. The major displacement component 32 is mounted in the major base body 31 and is capable of being moved along the major disengaging direction D2. The major displacement component 32 is part of the second major base 30 that corresponds to the major inserting head 20. The first major component 41 is mounted on the major displacement component 32. Please refer to FIG. 7 and FIG. 8. When the major inserting head 20 is inserted into the first base 10, the magnetic attraction force between the first major component 41 and the second major component 42 moves a major engaging portion 321 of the major displacement component 32 along the direction opposite the major disengaging direction D2 to engage with a major engaging groove 22 of the major inserting head 20, such that the major inserting head 20 enters the engaging state. Therefore, before the major inserting head 20 is inserted into the major insertion hole 11 of the first base 10, the major engaging portion 321 of the major displacement component 32 may not be located in the inserting path of the major inserting head 20, and thereby the major inserting head 20 will not be obstructed during inserting, which saves effort of a user for inserting the major inserting head 20.

In another embodiment, the second major base 30 may not be divided as the major base body 31 and the major displacement component 32, i.e. the second major base 30 is formed integrally. In such embodiment, before the major inserting head 20 is inserted into the major insertion hole 11 of the first base 10, the major engaging portion 321 of the major displacement component 32 may be located in the inserting path of the major inserting head 20, so the user has to push the major engaging portion 321 and the entire second major base 30 away before inserting the major inserting head 20, or move the second major base 30 by hand. After the major inserting head 20 is inserted to the predetermined position, the magnetic attraction forces from the major components 41, 42 push the second major base 30 such that the major engaging portion 321 engages with the major inserting head 20. Therefore, such embodiment may be utilized in the field that should not lock too easily.

Please refer to FIG. 3, FIG. 4, and FIG. 7. In the embodiment that the second major base 30 comprises the major base body 31 and the major displacement component 32, the second major base 30 may further comprise a major displacement elastic component 33 mounted between the major base body 31 and the major displacement component 32. The major displacement elastic component 33 is capable of moving the major displacement component 32 with respect to the major base body 31 along the major disengaging direction D2. Therefore, after the major inserting head 20 is moved out, the major displacement elastic component 33 may automatically push the major displacement component 32 back to an original position. It is not limited thereto, and the major displacement component 32 may be pushed to the original position by hand.

Figure 11:
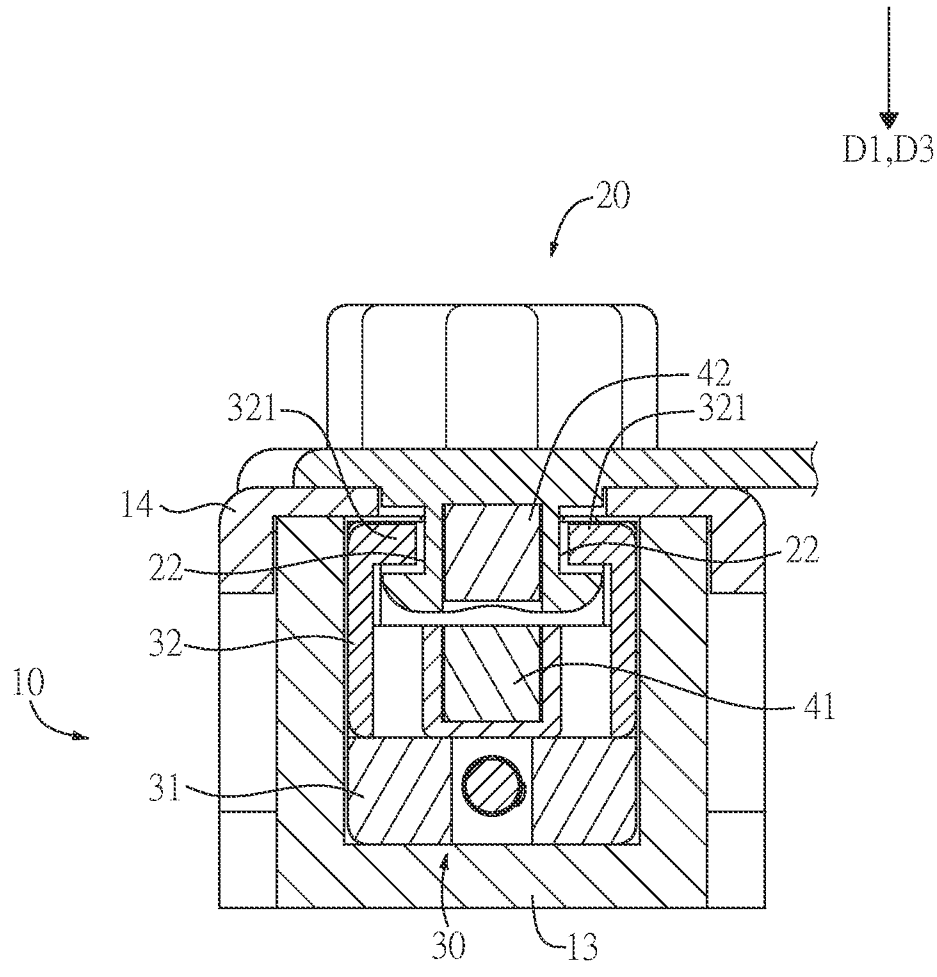
FIG. 11 is a lateral sectional view of the magnetic buckle device in FIG. 1.
Figure 12:
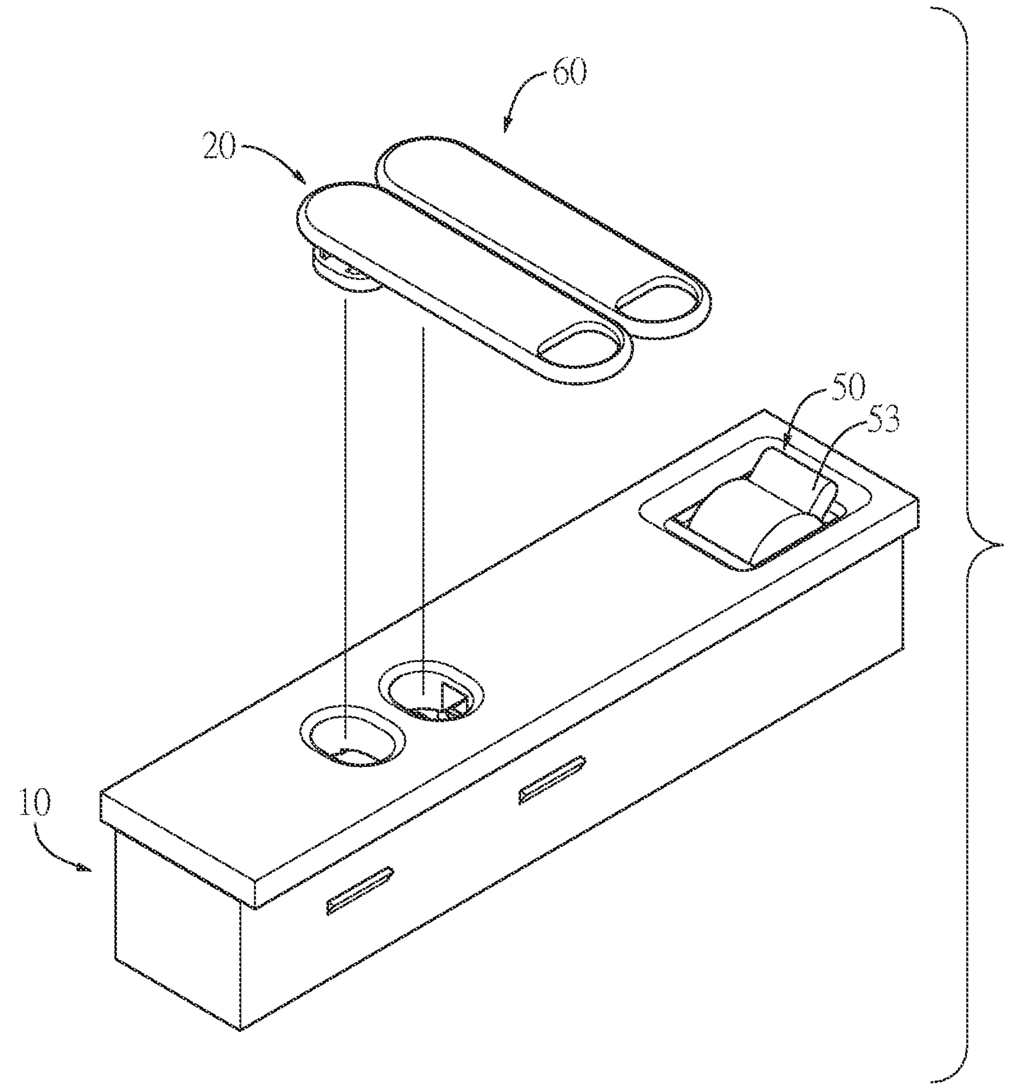
FIG. 12 is a perspective view of a magnetic buckle device in accordance with a second embodiment of the present invention.
Figure 13:
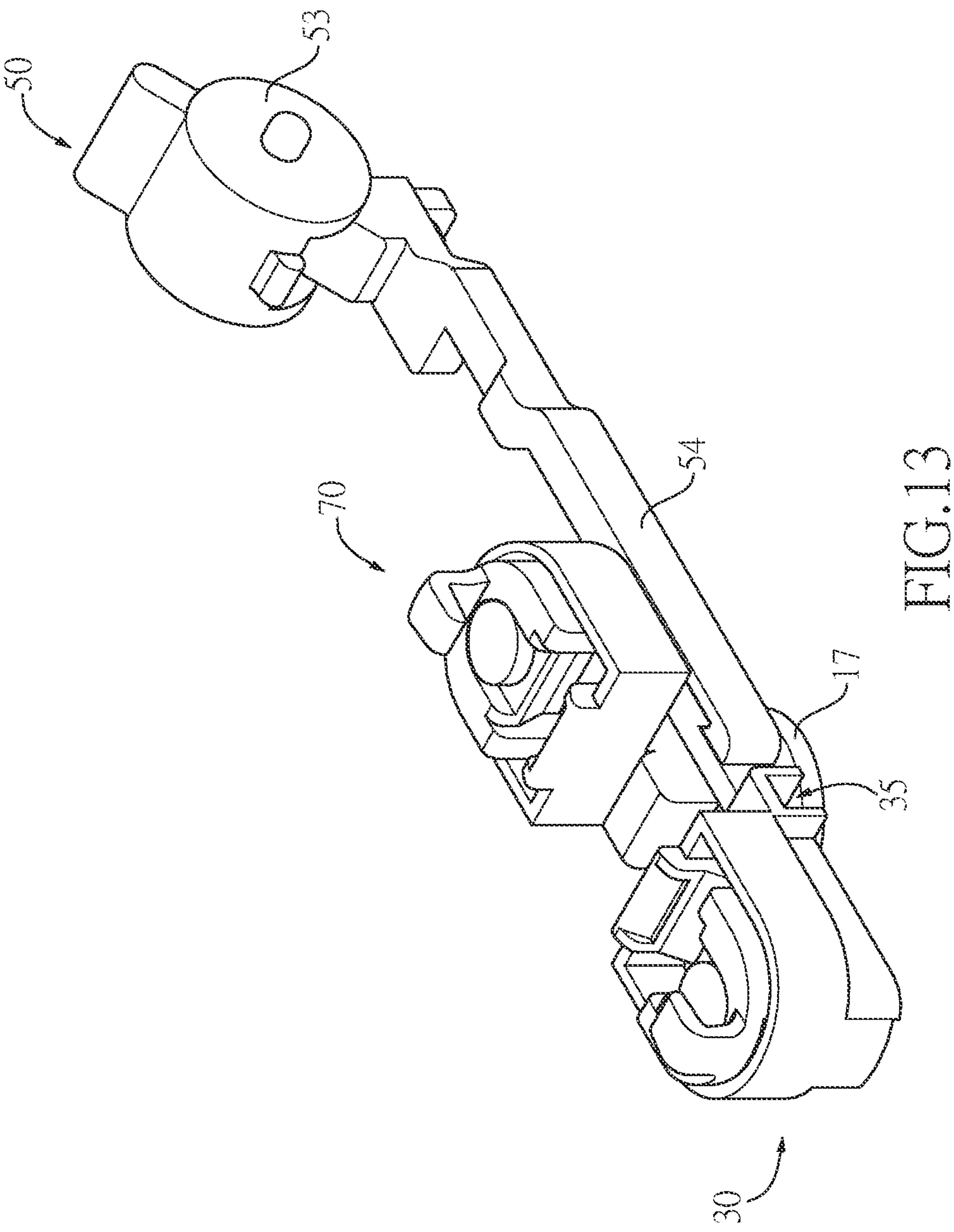
FIG. 13 is a perspective view of a combination of a second major base, a controlling assembly, etc. of the magnetic buckle device in FIG. 12.

Please refer to FIG. 3 and FIG. 11. The following details are about the major engaging portion 321 of the major displacement component 32 and the major engaging groove 22 of the major inserting head 20. In this embodiment, the major displacement component 32 comprises two said major engaging portions 321. The major inserting head 20 comprises two said major engaging grooves 22 located on two opposite sides. When the major inserting head 20 is moved along the major engaging direction D1, the two major engaging portions 321 will be inserted into the two major engaging grooves 22 respectively, so the major inserting head 20 is engaged from the two opposite sides, which firmly fixes the major inserting head 20.

Details about the second minor base 70 and the minor inserting head 60 are as follows:

Please refer to FIG. 3, FIG. 4, and FIG. 7. The second minor base 70 comprises a minor base body 71, a minor displacement component 72, and a minor displacement elastic component 73. The minor displacement component 72 is movably mounted in the minor base body 71. The minor base body 71 is part of the second minor base 70 and said part is connected to the major base body 31. The minor rack 74 is mounted on the minor base body 71. The minor displacement elastic component 73 is mounted between the minor base body 71 and the minor displacement component 72 and configured to move the minor displacement component 72 to move along the minor disengaging direction D4 with respect to the minor base body 71. The first minor component 81 is mounted on the minor displacement component 72. When the minor inserting head 60 is moved along the minor engaging direction D3 and inserted into the first base 10, the magnetic attraction force between the first minor component 81 and the second minor component 82 moves the minor displacement component 72 along a direction opposite the minor disengaging direction D4 to engage with the minor inserting head 60, such that the minor inserting head 60 enters the engaging state. The structures of the minor base body 71 and the minor displacement component 72 are similar to that of the major base body 31 and the major displacement component 32, so detailed description is omitted hereinafter.

Please refer to FIG. 8 to FIG. 10. When the second minor base 70 is moved along the minor disengaging direction D4, a reaction force may be generated in a direction opposite the minor engaging direction D3 to resist the magnetic attraction force between the first minor component 81 and the second minor component 82, such that a side of the minor inserting head 60 is tilted up and thereby an angle between the first minor component 81 and the second minor component 82 is changed; the side of the minor inserting head 60 is opposite the minor disengaging direction D4. Thus, the minor inserting head 60 is moved out of the first base 10. The second minor base 70 comprises a minor tiling-abutting portion 711. The structures of the second minor base 70 and the minor inserting head 60 are the same as those of the second major base 30 and the major inserting head 20, so detailed description is omitted hereinafter.

Consequently, with reference to FIG. 7 and FIG. 8, the present invention provides components respectively on the second major base 30, the second minor base 70, the major inserting head 20, and the minor inserting head 60. Therefore, when the inserting heads are moved close to the insertion holes of the first base 10, the magnetic attraction force between the corresponding two components may guide the inserting heads, which makes the inserting heads close to the insertion holes and tend to enter the insertion holes. Therefore, the inserting of the inserting head is assisted.

Then, when the inserting heads are inserted to predetermined positions, the magnetic attraction force between the corresponding two components will move the displacement components (e.g. the major displacement component 32 and the minor displacement component 72) to engage with the inserting heads, such that the inserting heads enter the engaging state. Therefore, the user may easily lock the present invention without exerting force on it.

In other words, with the magnetic attraction forces from the components, the inserting head is guided and thus facilitates inserting the inserting head and lowering the needed force for inserting by the user, which improves convenience.

During the unlocking process, the controlling assembly 50 may push both the second major base 30 and the second minor base 70 to move out of the two inserting heads 20, 60, and then the two inserting heads 20, 60 will move away from each other and out of the first base 10 obliquely but keep abutting the first base 10, which facilitates grabbing any one of the two inserting heads 20, 60.

Figure 14:
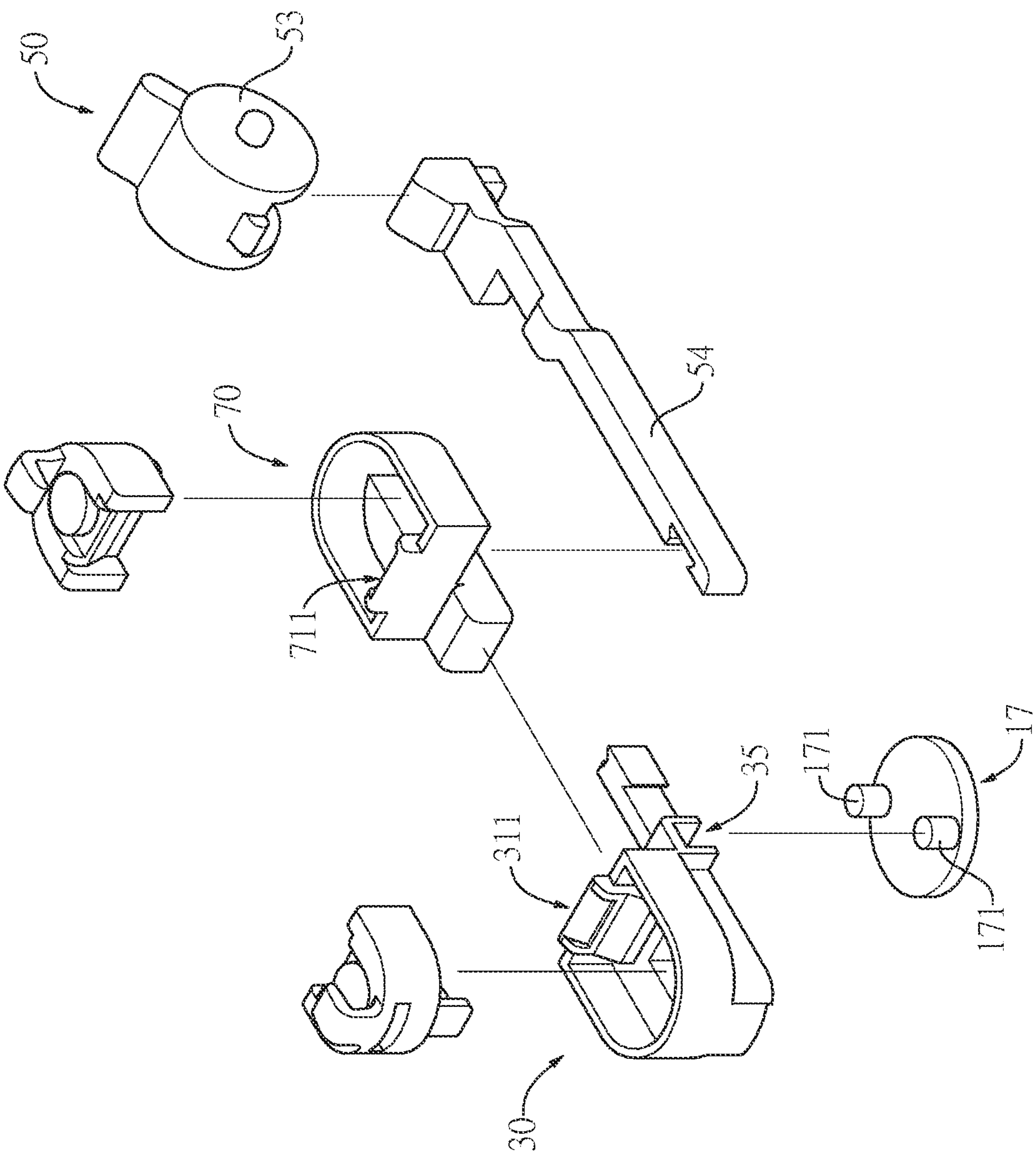
FIG. 14 is an exploded view of the magnetic buckle device in FIG. 13.
Figure 15:
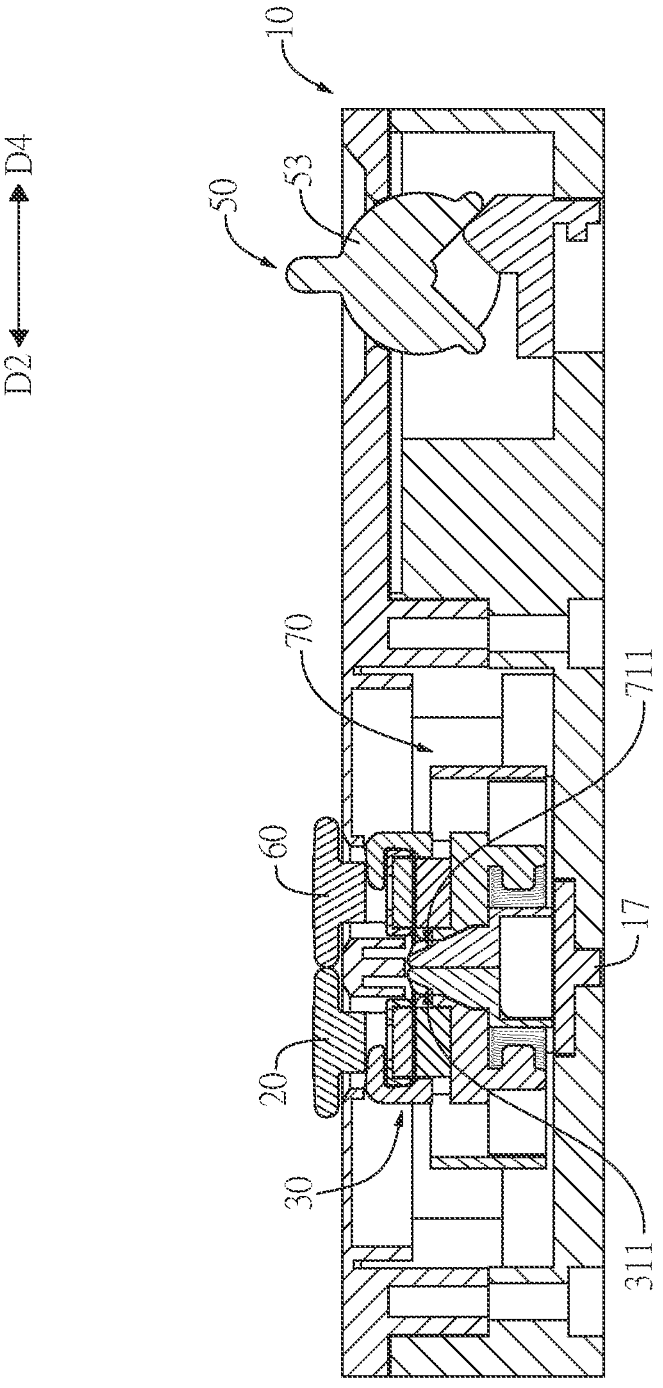
FIGS. 15 and 16 are front, sectional, and operational views of the magnetic buckle device in FIG. 12.
Figure 16:
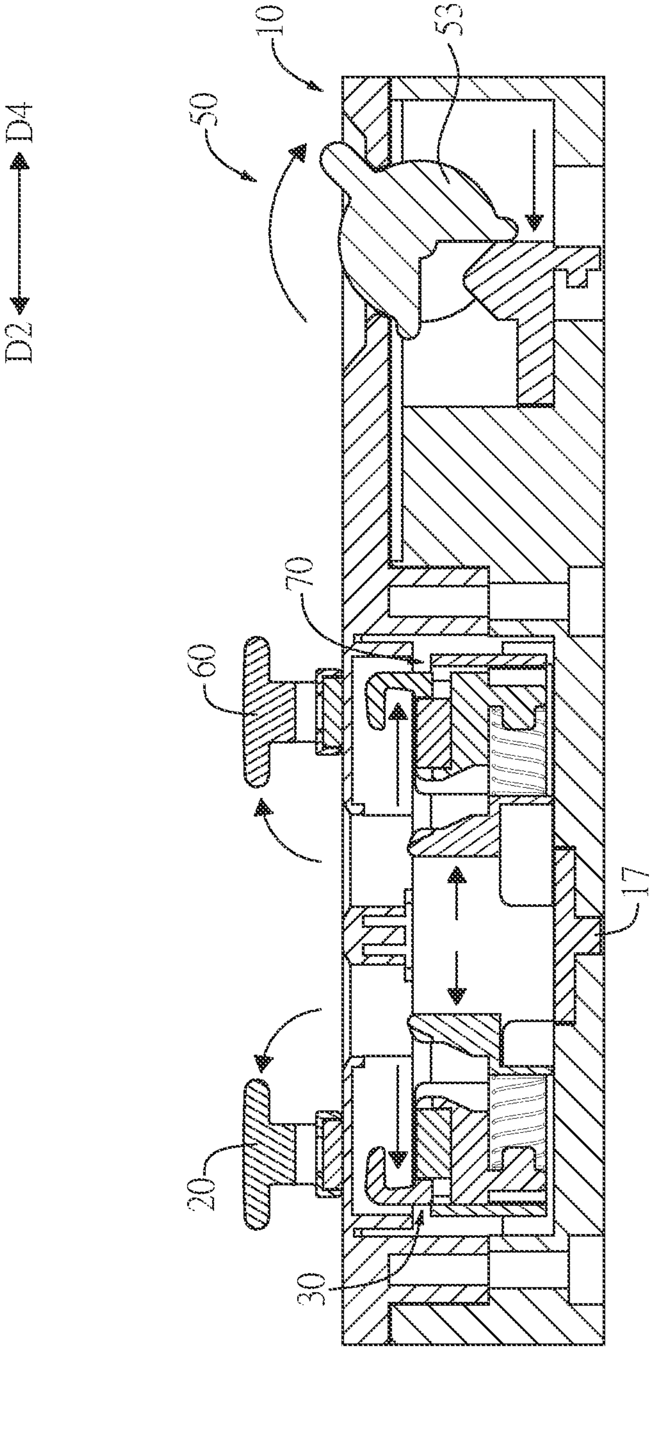

Please refer to FIG. 12 to FIG. 16. In a second embodiment, the controlling assembly 50 may directly push the second major base 30 forward and backward along the major disengaging direction D2. Precisely, the controlling assembly 50 comprises a rotated component 53 and a transmitting component 54. The rotated component 53 is pivotally mounted on the first base 10 and is capable of being rotated with respect to the first base 10 to move the transmitting component 54 forward and backward. The transmitting component 54 is movably mounted in the first base 10 and is capable of being moved along the major disengaging direction D2 forward and backward. One end of the transmitting component 54 is connected to and fixed on the second major base 30, so the user can control the position of the second major base 30 via poking the rotated component 53 (as shown in FIG. 15 and FIG. 16). In the second embodiment, the minor inserting head 60 and the second minor base 70 are closer to the controlling assembly 50 than the second major base 30 and the major inserting head 20, but in another embodiment, the second major base 30 and the major inserting head 20 may be closer to the controlling assembly 50.

Figure 17:
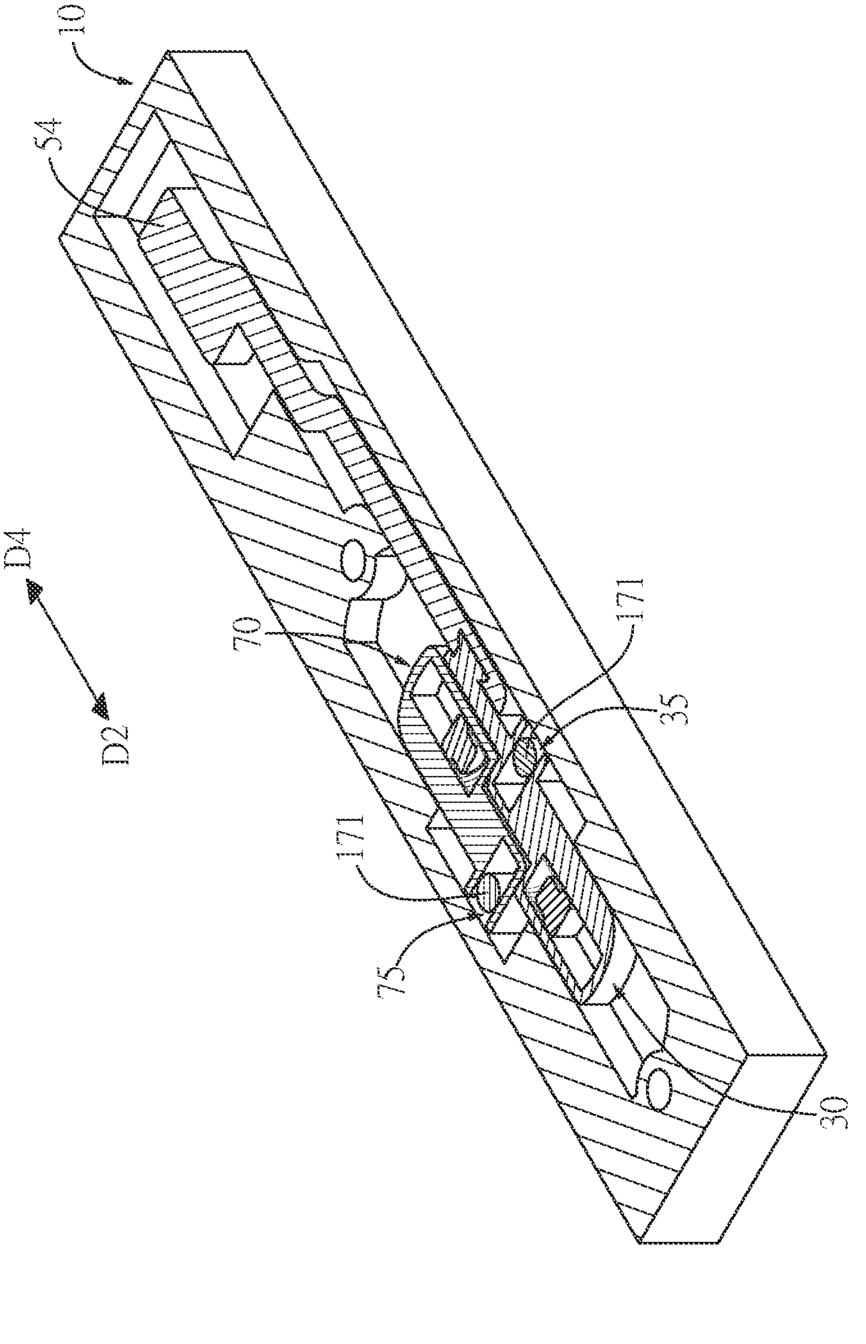
FIGS. 17 and 18 are perspective, sectional, and operational views of the magnetic buckle device in FIG. 12.
Figure 18:
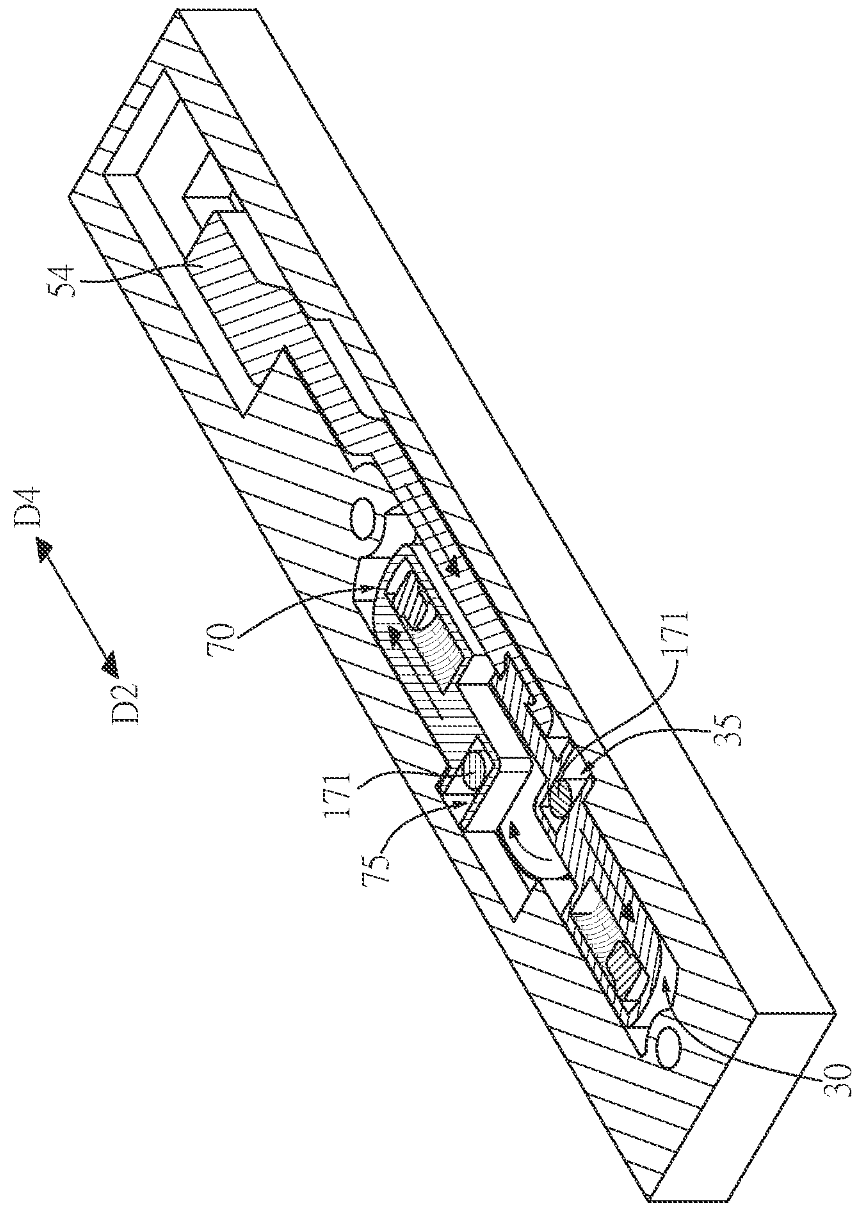

Please refer to FIG. 14, FIG. 17, and FIG. 18. In the second embodiment, the movement of the second major base 30 pushing out the major inserting head 20 may further move out the second minor base 70 with respect to the minor inserting head 60. Precisely, a knob 17 is mounted between the second major base 30 and the second minor base 70. The knob 17 is connected to the second major base 30 and the second minor base 70 and moved along with the second major base 30 and the second minor base 70. When the second major base 30 is moved along the major disengaging direction D2 or its opposite direction, the movement of the second major base 30 will rotate the knob 17, and then the rotation of the knob 17 moves the second minor base 70 along a direction opposite the second major base 30. In a preferred embodiment, the second major base 30 forms a major groove 35. The major groove 35 extends in a direction preferably perpendicular to the major disengaging direction D2. The second minor base 70 forms a minor groove 75. The minor groove 75 extends in a direction preferably perpendicular to the minor disengaging direction D4. The knob 17 forms two guiding sticks 171 protruding thereon and respectively mounted through the major groove 35 of the second major base 30 and the minor groove 75 of the second minor base 70, and thereby the movement is transformed into the rotation.

Please refer to FIG. 15 and FIG. 16. In the second embodiment, in the engaging state, after being poked, the rotated component 53 compulsorily moves the second major base 30 (along the major disengaging direction D2) and the second minor base 70 (along the minor disengaging direction D4), and then the major tiling-abutting portion 311 of the second major base 30 and the minor tiling-abutting portion 711 of the second minor base 70 respectively push the major inserting head 20 and the minor inserting head 60 out of the first base 10 (popping out). Therefore, the second embodiment can achieve the same goal as the previous embodiments.

Figure 19:
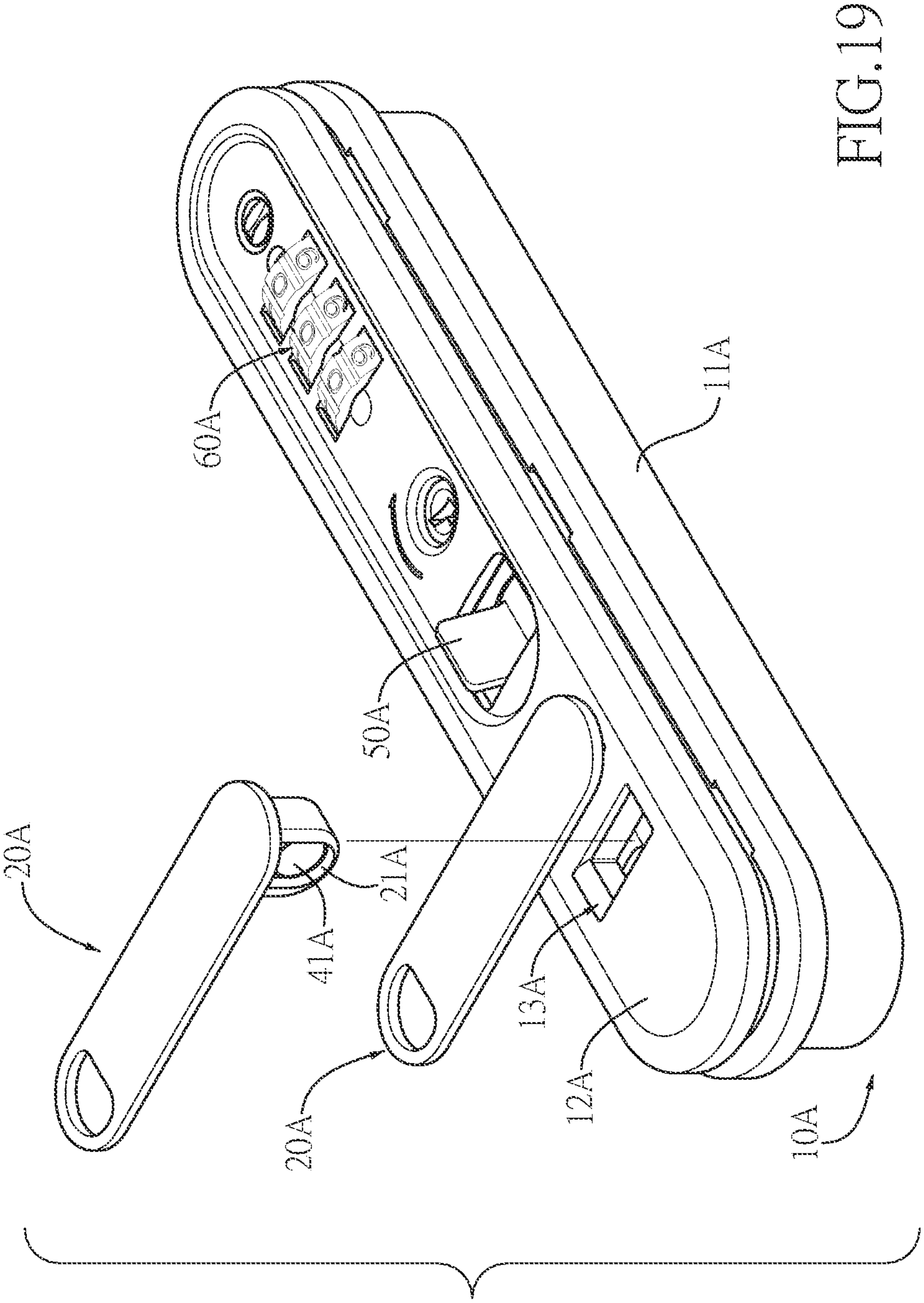
FIG. 19 is a perspective view of a magnetic buckle device in accordance with a third embodiment of the present invention.
Figure 20:
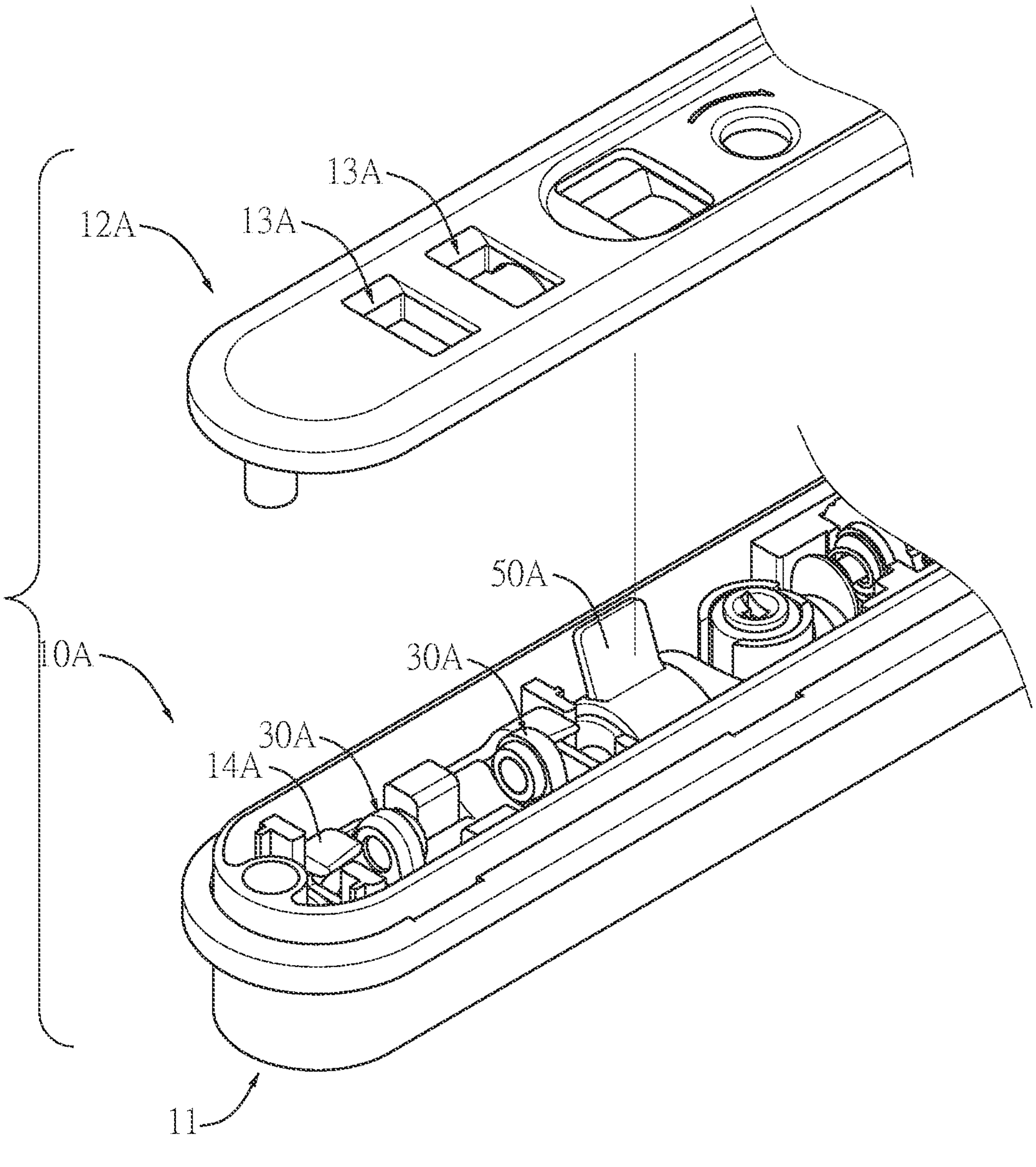
FIGS. 20 to 23 are exploded views of the magnetic buckle device in FIG. 19.
Figure 21:
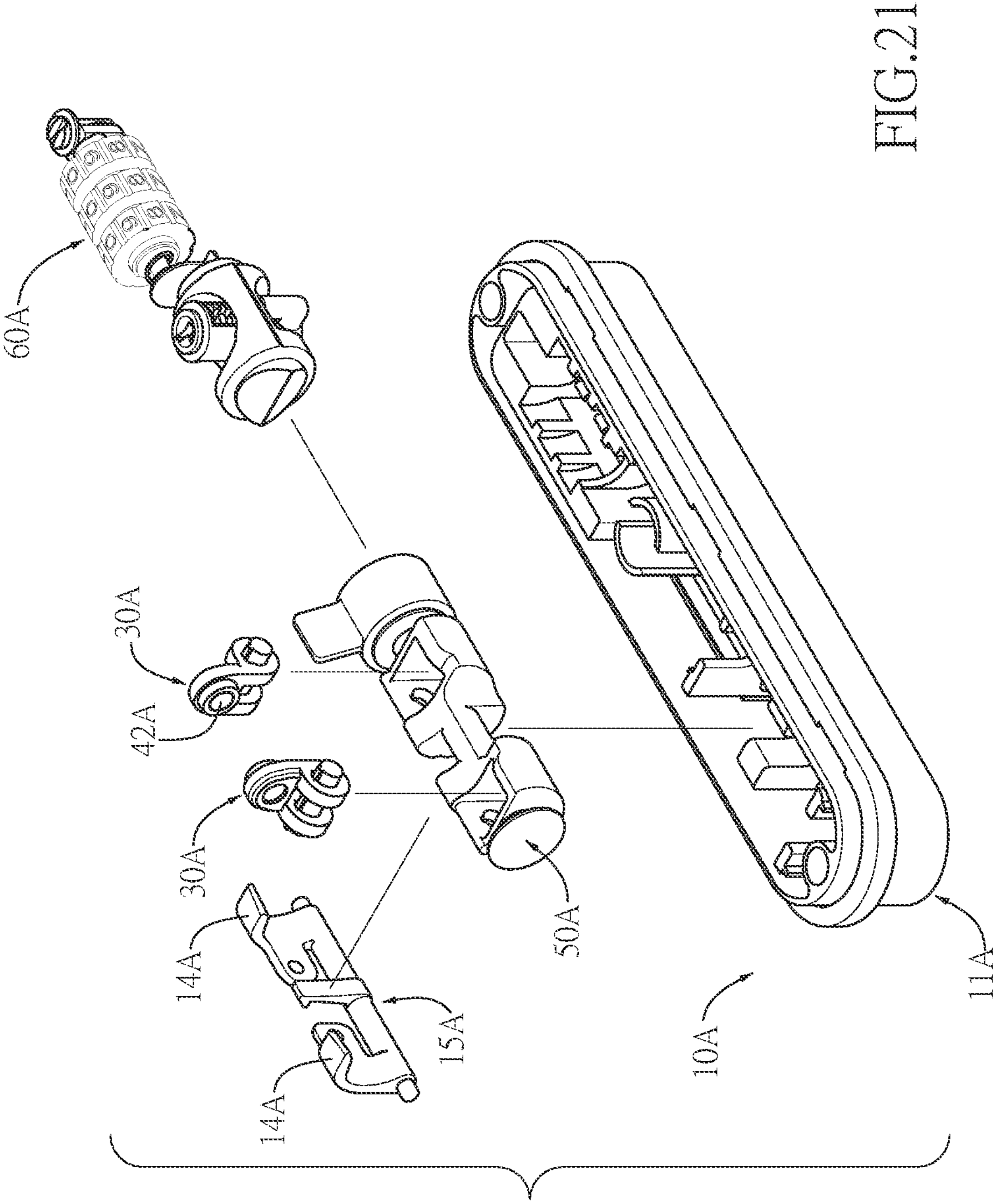

Please refer to FIG. 19 to FIG. 21. A third embodiment of the magnetic buckle device is provided and comprises a first base 10A, two inserting heads 20A, two second bases 30A, two second components 41A, and two first components 42A, and preferably further comprises an operating component 50A and a controlling assembly 60A. The two inserting heads 20A may be regarded as a major inserting head and a minor inserting head. The two second bases 30A may be regarded as a second major base and a second minor base. The two second components 41A may be regarded as a second major component and a second minor component. The two first components 42A may be regarded as first major component and a first minor component.

The first base 10A comprises the insertion hole 13A. In this embodiment, the first base 10A may be a shell and preferably comprises a bottom part 11A and an upper lid 12A. The insertion hole 13A is formed on the upper lid 12A.

The two inserting heads 20A may be inserted into the two insertion holes 13A of the first base 10A along an engaging direction.

Figure 25:
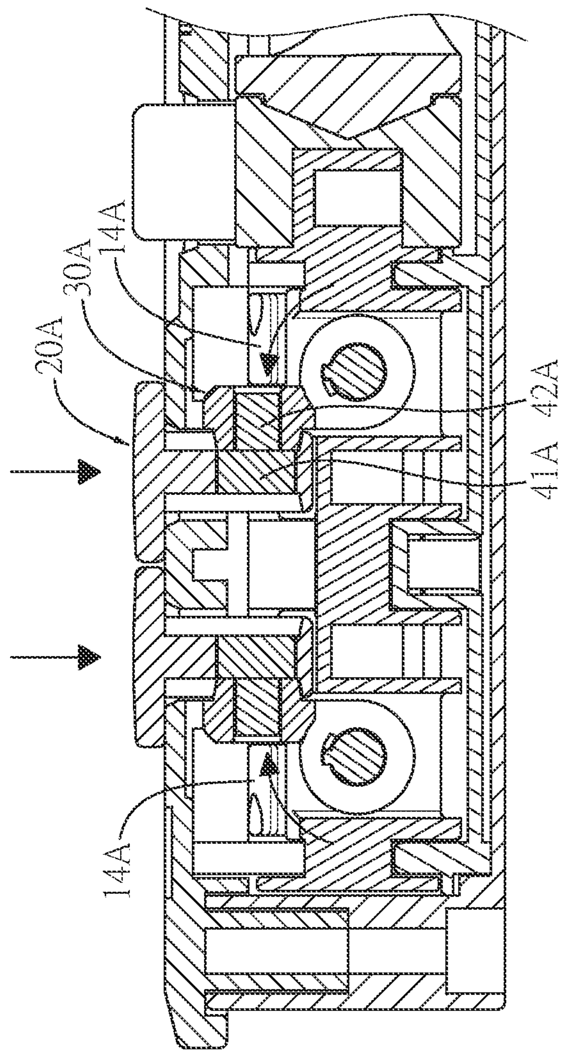

Please refer to FIG. 20, FIG. 21, and FIG. 25. The two second bases 30A are capable of being rotated with respect to the first base 10A (i.e. rotated forward) such that the two inserting heads 20A enter as the engaging state (as shown in FIG. 25). The two second bases 30A are capable of being rotated backward with respect to the first base 10A (i.e. away from the two inserting heads 20A) such that the two inserting heads 20A are changed to a disengaging state.

Figure 22:
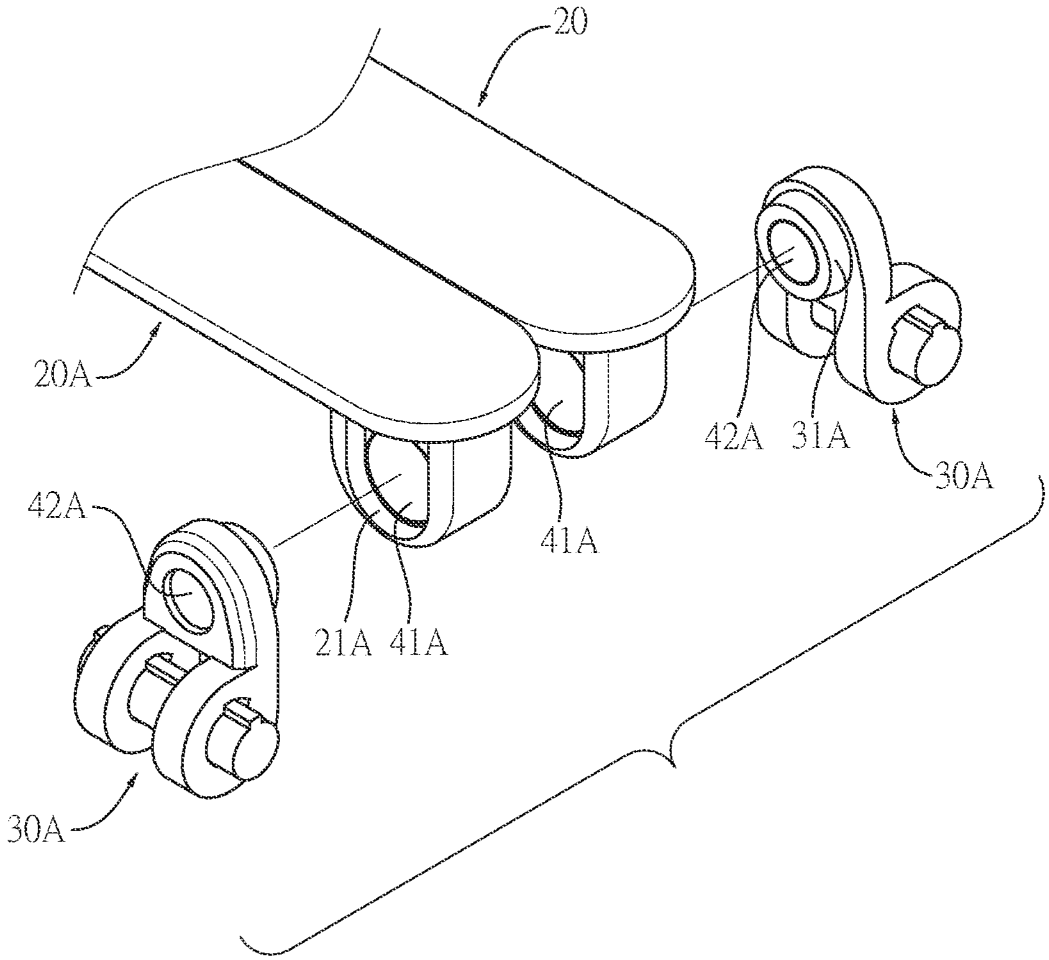
Figure 24:
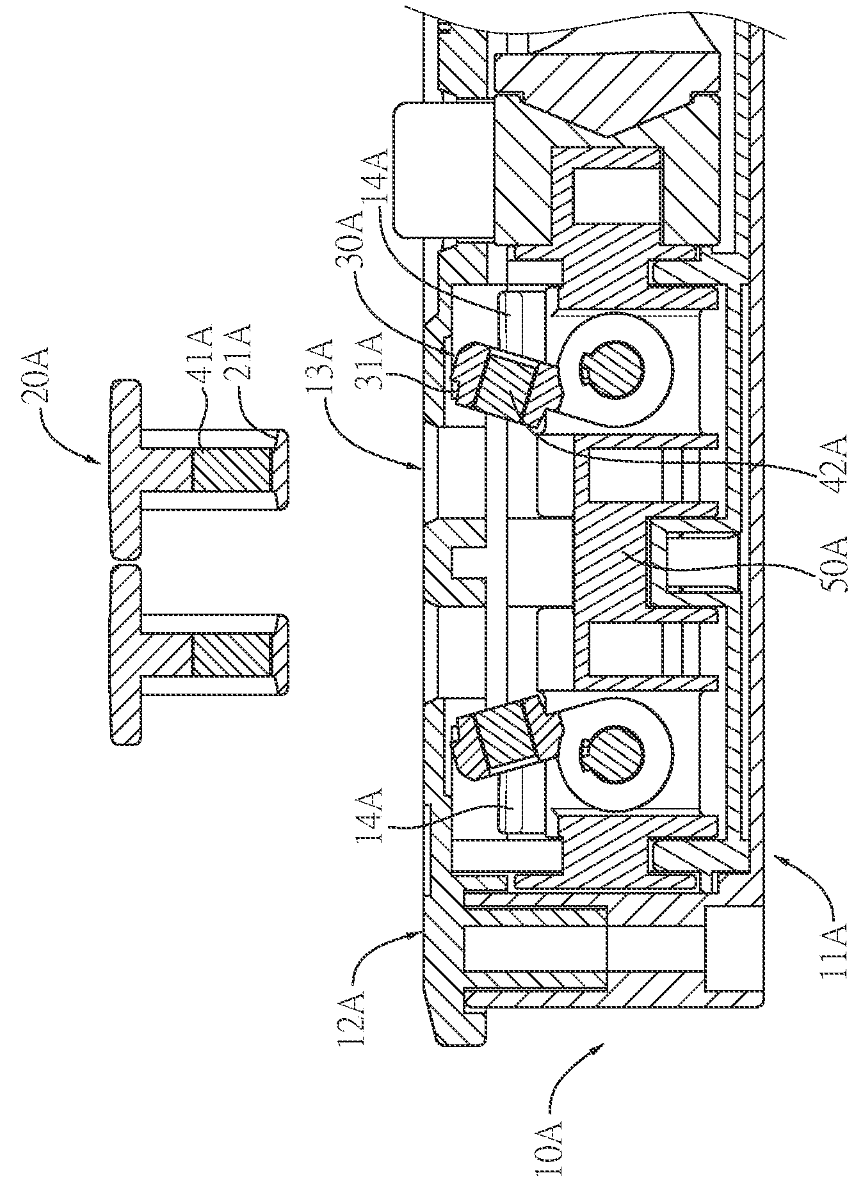
FIGS. 24 and 25 are front, sectional, and operational views of the magnetic buckle device in FIG. 19.

Please refer to FIG. 22, FIG. 24, and FIG. 25. The two second components 41A are respectively mounted on the two inserting heads 20A. The two first components 42A are respectively mounted on the two second bases 30A. When each one of the two inserting heads 20A is inserted into the first base 10A along the engaging direction, magnetic attraction forces are generated between each one of the second components 41A on the two inserting heads 20A and the corresponding first component 42A on the second base 30A, which rotates the second base 30A such that the two inserting heads 20A enter the engaging state. In this embodiment, after the magnetic attraction force rotates the second bases 30A, the second bases 30A may pass through and into the two inserting heads 20A such that the two inserting heads 20A cannot depart from the first base 10A, i.e. the two inserting heads 20A enter the engaging state.

One of the second components 41A and the first components 42A may be a magnet and the other one may be a metal, or both are magnets.

The second components 41A and the first components 42A are individual components, but, in another embodiment, the second components 41A and the first components 42A may each be formed integrally with their respective component.

Figure 37:
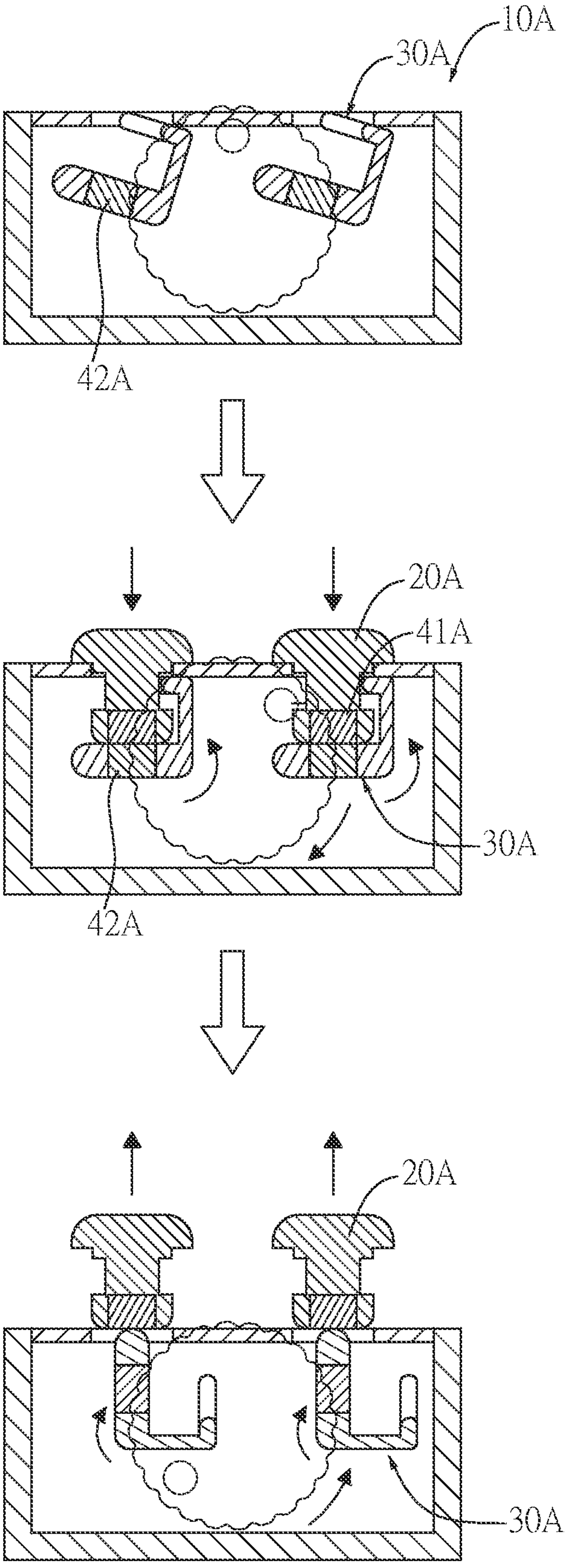
FIG. 37 shows front, sectional, and operational views of the magnetic buckle device in FIG. 35.

Please refer to FIG. 20, FIG. 21, and FIG. 24. The second bases 30A are capable of being rotated with respect to the first base 10A. Precisely, the second bases 30A may be pivotally mounted on the first base 10A (as shown in FIG. 37), or, as in the third embodiment, the second bases 30A are pivotally mounted on an operating component 50A and the operating component 50A is rotatably mounted on the first base 10A. Thus, the second base 30A is still capable of being rotated with respect to the first base 10A. The rotation axis of the operating component 50A with respect to the first base 10A is not parallel with the rotation axis of the second base 30A with respect to the operating component 50A, and preferably the two axes are perpendicular to each other. Hereinafter, the rotation of the operating component 50A with respect to the first base 10A is called "lateral rotation," but the specific rotating direction is not limited thereto. Further, an elastic component may be mounted between the operating component 50A and the first base 10A, or the first base 10A forms an elastic structure to push the operating component 50A such that the operating component 50A is capable of being laterally rotated back with respect to the first base 10A.

When the two inserting heads 20A are in the engaging state, the operating component 50A is laterally rotated with respect to the first base 10A and drives the second bases 30A on the operating component 50A to depart from the two inserting heads 20A, such that the two inserting heads 20A enter the disengaging state. In a preferred embodiment, the operating component 50A is laterally rotated with respect to the first base 10A to rotate backward the second bases 30A on the operating component 50A to depart from the two inserting heads 20A.

Besides, the operating component 50A may be laterally rotated by manual operation directly or by another component.

Figure 26:
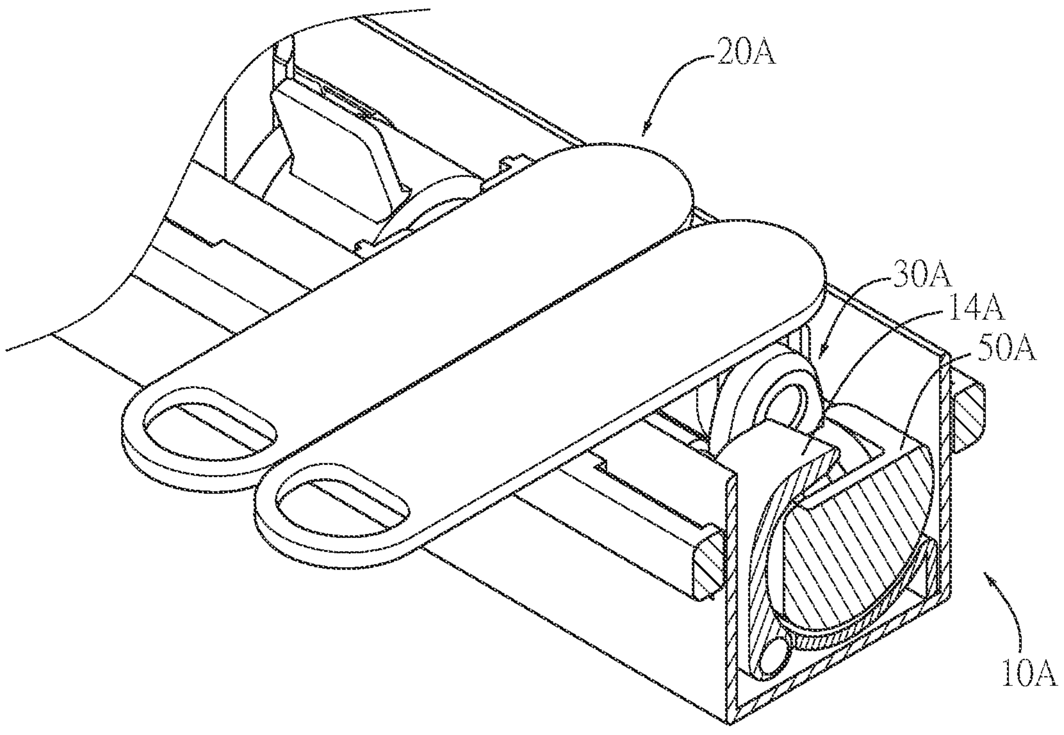
FIG. 26 is a perspective and sectional view of the magnetic buckle device in FIG. 19.

Please refer to FIG. 20, FIG. 21, and FIG. 26. In the third embodiment, the bottom part 11A of the first base 10A comprises two block portions 14A respectively corresponding to the two second bases 30A. The two block portions 14A may be regarded as a major block portion and a minor block portion. Preferably, the first base 10A further comprises a lateral tilting portion 15A. The lateral tilting portion 15A is pivotally mounted on the bottom part 11A. The block portions 14A are mounted on the lateral tilting portion 15A and protrude from a side surface of the bottom part 11A to another side surface of the bottom part 11A. It is not limited thereto, and the block portions 14A may be formed on and protrude out of an inner surface of the bottom part 11A.

Please refer to FIG. 22. Each one of the two second bases 30A comprises a second base action portion 31A. The two second base action portions 31A of the two second bases 30A may be regarded as a second major base action portion and a second minor base action portion. The second base action portion 31A preferably is a bump having an inclined and round surface. Each one of the two inserting heads 20A comprises an inserting head action portion 21A. The inserting head action portion 21A preferably is a groove having an inclined and round surface. The two inserting head action portions 21A of the two inserting heads 20A may be regarded as a major inserting head action portion and a minor inserting head action portion.

Please refer to FIG. 24 and FIG. 25. When the two inserting heads 20A are inserted into the first base 10A, the magnetic attraction force rotates the second base 30A such that the second base action portion 31A and the inserting head action portion 21A cooperate with each other, and thereby the two inserting heads 20A enter the engaging state. Precisely, the bump of the second base action portion 31A is received in the groove of the inserting head action portion 21A and thus the two inserting heads 20A cannot depart from the first base 10A.

Please refer to FIG. 22, FIG. 25, and FIG. 26. After the magnetic attraction force rotates the second bases 30A, the block portion 14A of the first base 10A abuts the second base 30A, such that the two inserting heads 20A are kept in the engaging state. Preferably, after the second bases 30A are rotated, the block portion 14A abuts ends of the second bases 30A; said ends of the two inserting heads 20A are the end opposite the two inserting heads 20A. Therefore, the second bases 30A cannot be rotated so the bump of the second base action portion 31A cannot be separated from the groove of the inserting head action portion 21A. In other words, the two inserting heads 20A cannot be separated from the first base 10A. However, the means for keeping the two inserting heads 20A in the engaging state by the block portion 14A is not limited thereto.

To unlock, the operating component 50A is laterally rotated with respect to the first base 10A, and then the second base 30A on the operating component 50A will depart from the block portion 14A because of the lateral rotations. Preferably, the operating component 50A is laterally rotated away from the block portion 14A, so the second base 30A will move away from the block portion 14A rather than be pushed by the block portion 14A. Therefore, after the operating component 50A is laterally rotated, the second bases 30A are capable of being rotated backward to depart from the two inserting heads 20A. However, the means for separating the second base 30A and the block portion 14A is not limited thereto.

In the meantime, when the second bases 30A are laterally rotated along with the operating component 50A, the second base action portions 31A and the inserting head action portions 21A of the two inserting heads 20A cooperate with each other such that the second bases 30A are rotated backward and depart from the two inserting heads 20A. Precisely, when the second bases 30A are laterally rotated along with the operating component 50A, the bump of the second base action portion 31A that has the inclined and round surface may be moved along with the groove of the inserting head action portion 21A that has the inclined and round surface. Said two inclined and round surfaces push the second bases 30A away from the two inserting heads 20A, i.e. the second bases 30A are rotated backward. However, the means for rotating the second bases 30A backward and departing from the two inserting heads 20A is not limited thereto.

Figure 27:
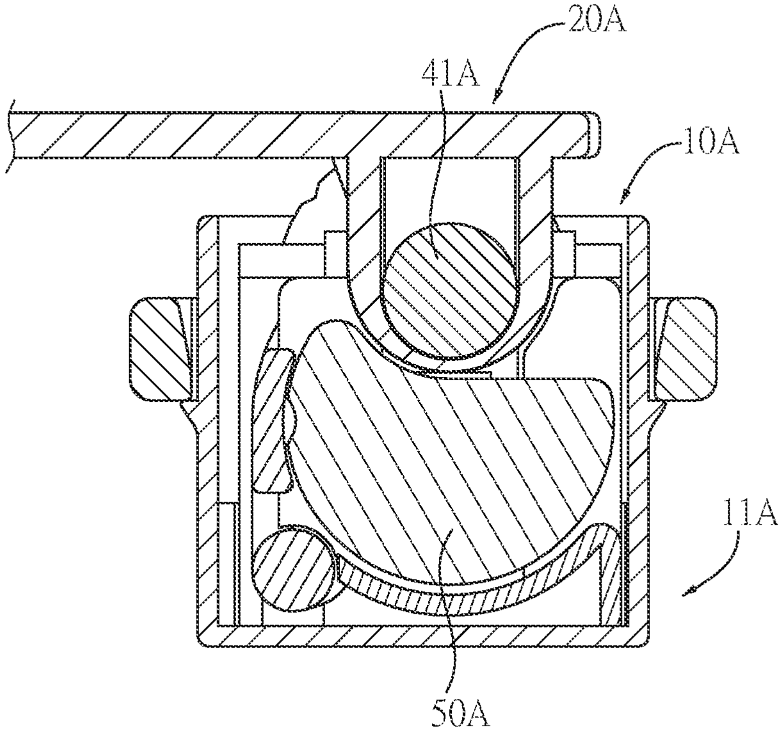
FIGS. 27 and 28 are lateral, sectional, and operational views of the magnetic buckle device in FIG. 19.
Figure 28:
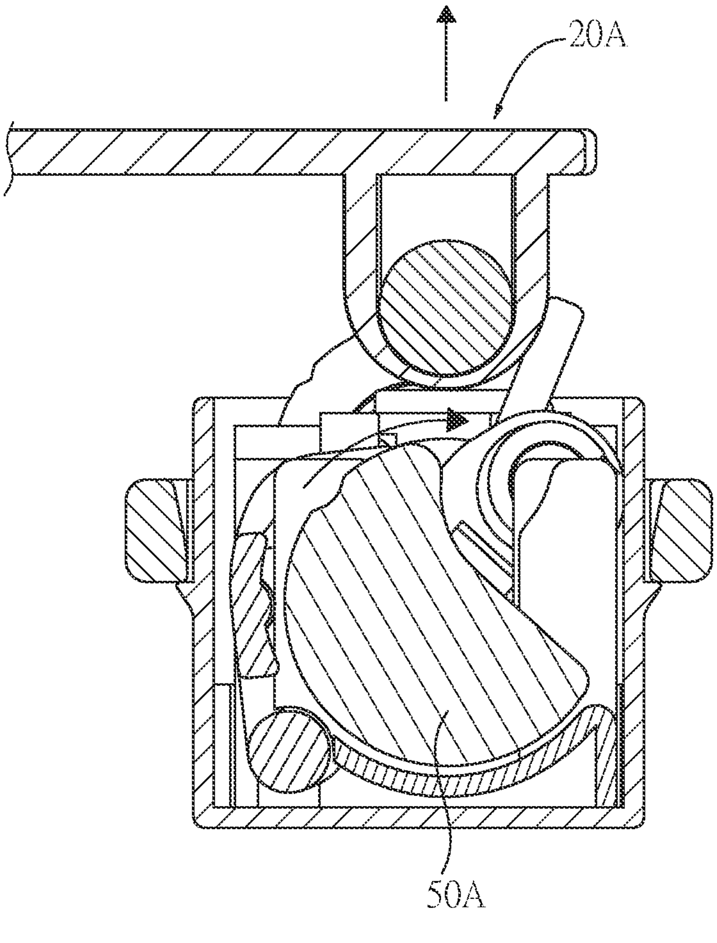

Please refer to FIG. 21, FIG. 27, and FIG. 28. Meanwhile, when the operating component 50A is laterally rotated with respect to the first base 10A, the operating component 50A pushes the two inserting heads 20A and thereby the two inserting heads 20A are moved out of the insertion hole 13A of the first base 10A. Besides, as mentioned above, when the second bases 30A are laterally rotated along with the operating component 50A, the second bases 30A are rotated backward. When the second bases 30A are rotated backward, the first components 42A on the second bases 30A are gradually inclined with respect to the second components 41A on the two inserting heads 20A, so the angles of the magnate forces therebetween are also gradually changed. After the second bases 30A are rotated backward and thus the angels between the first components 42A and the second components 41A are larger than a predetermined degree (e.g. 7 degrees preferably, but not limited thereto), the magnetic attraction forces between the first components 42A and the second components 41A will become magnetic repulsion forces and thereby push the two inserting heads 20A out. The means for pushing the two inserting heads 20A out of the first base 10A is not limited to the aforesaid way. For example, in an embodiment without the operating component 50A, the second bases 30A may directly contact and push the two inserting heads 20A out (as shown in FIG. 37).

Please refer to FIG. 29 to FIG. 34. In a fourth embodiment of the present invention, the objective of the present invention is achieved in another way. First, after the two inserting heads 20A are inserted into the first base 10A, thereby rotating the second bases 30A by the magnetic attraction forces, how to keep the two inserting heads 20A in the engaging state? Second, when the operating component 50A is laterally rotated with respect to the first base 10A, how to separate the second bases 30A and the two inserting heads 20A?

Figure 29:
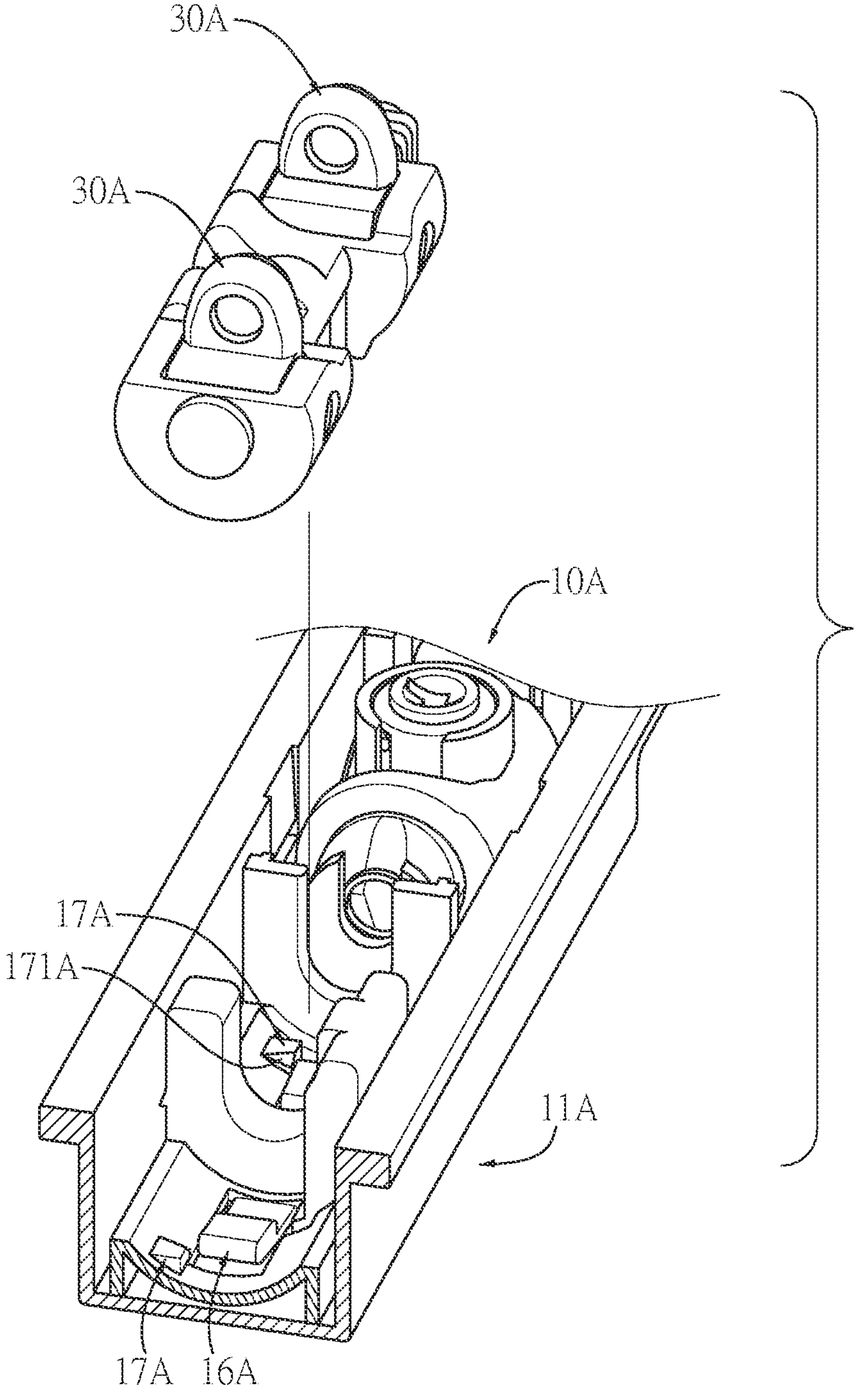
FIG. 29 is a perspective and sectional view of a magnetic buckle device in accordance with a fourth embodiment of the present invention.
Figure 30:
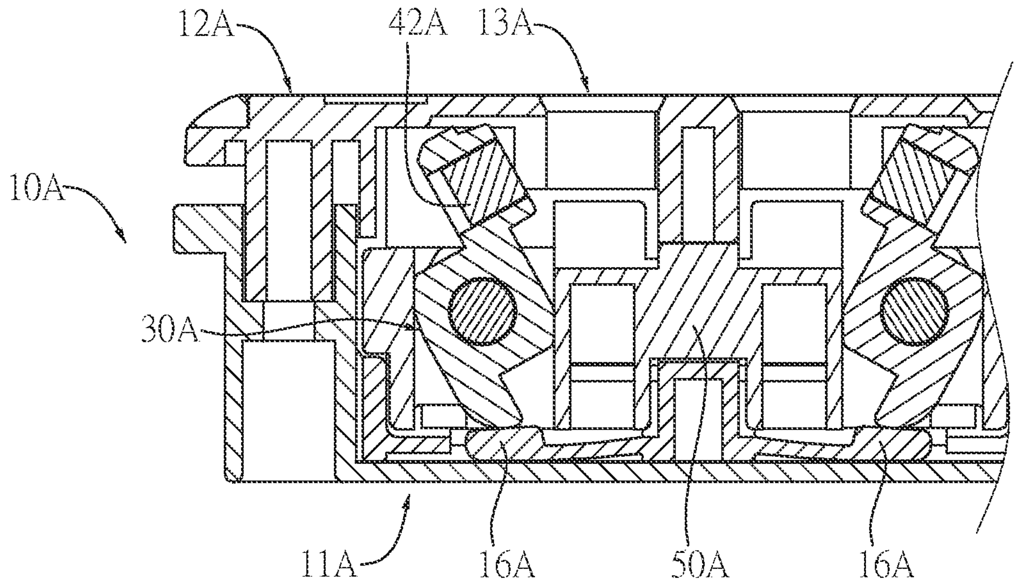
FIGS. 30 and 31 are front, sectional, and operational views of the magnetic buckle device in FIG. 29.
Figure 31:
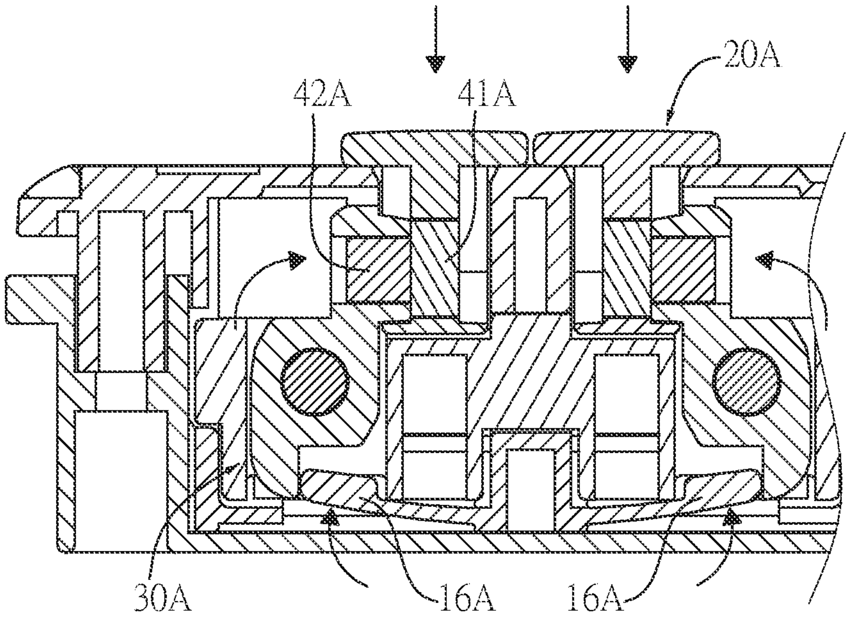
Figure 32:
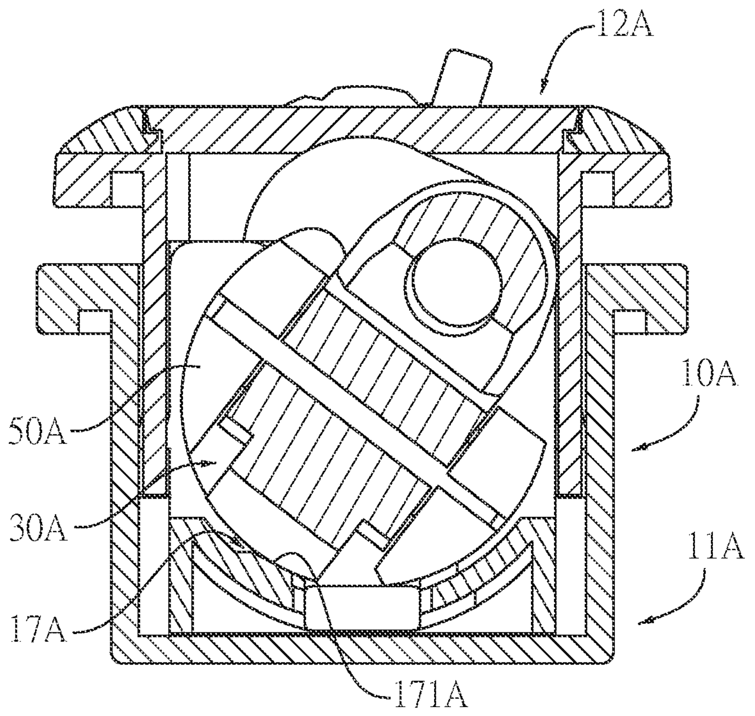
FIG. 32 is a lateral sectional view of the magnetic buckle device in FIG. 29.
Figure 33:
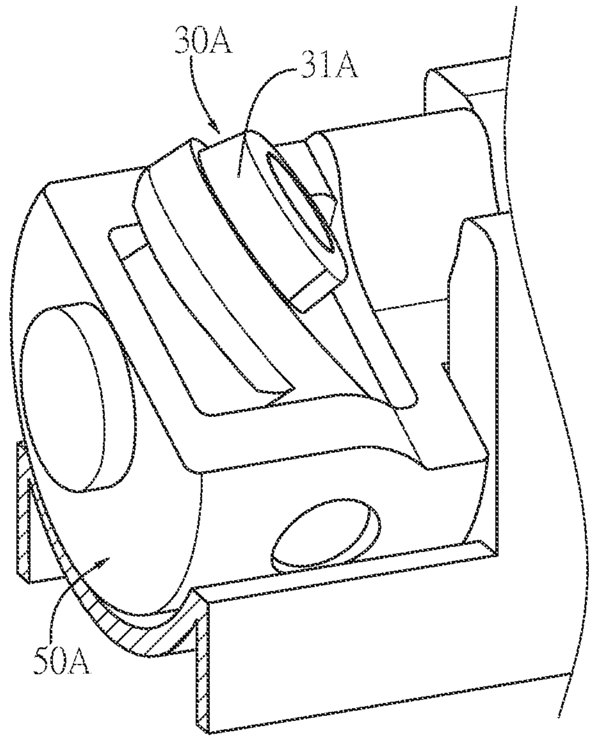
FIGS. 33 and 34 are perspective and sectional views of the magnetic buckle device in FIG. 29.

With regard to the first point, please refer to FIG. 29 to FIG. 31. In the fourth embodiment, the first base 10A comprises two rotating preventing portions 16A corresponding to the two second bases 30A respectively. The rotating preventing portions 16A preferably are elastic, and precisely, they are elastic components, e.g. springs. In another embodiment, the elasticity of the rotating preventing portions 16A may come from their structures. In this embodiment, each one of the rotating preventing portions 16A is a flat spring formed on a bottom surface of the bottom part 11A. A free end of the flat spring extends upward. Normally, the second bases 30A downward press the flat springs. After the second bases 30A are rotated by the magnetic attraction force, the second bases 30A will depart from the flat spring but the free ends of the flat spring push the second bases 30A, and thus the second bases 30A cannot be rotated back, and thereby the second base 30A cannot depart from the two inserting heads 20A. During the unlocking process, the second bases 30A are laterally and backward rotated along with the operating component 50A, the second bases 30A bypass the flat springs of the rotating preventing portions 16A and are not abutted by the rotating preventing portions 16A, which allows the second bases 30A to be rotated backward. Finally, when the operating component 50A is laterally rotated with respect to the first base 10A to its original position, the second bases 30A are laterally and backward rotated along with the operating component 50A and press the flat spring of the rotating preventing portion 16A again.

Figure 34:
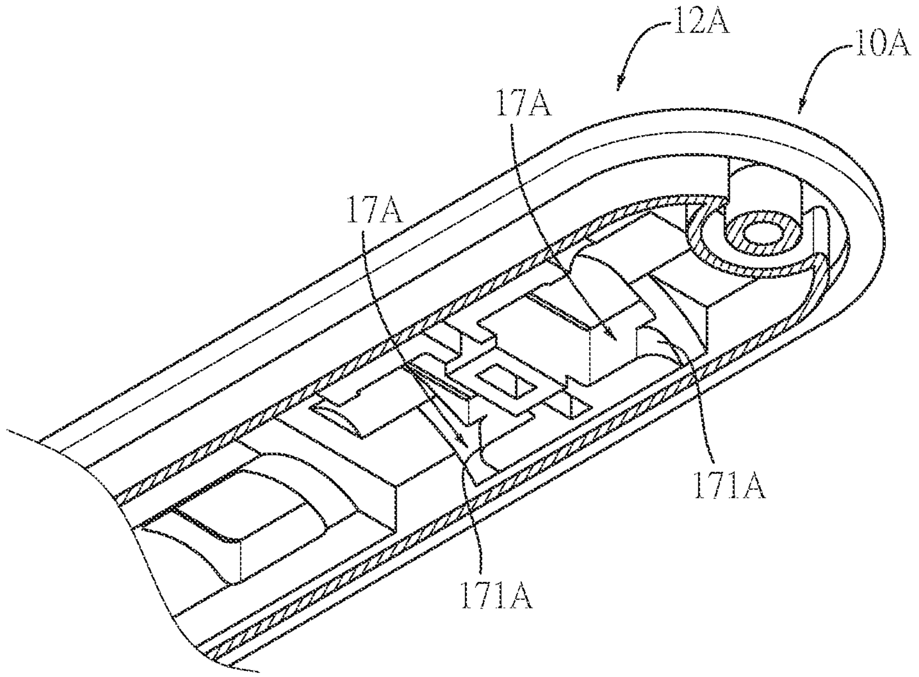

With regard to the second point, please refer to FIG. 29 and FIG. 32 to FIG. 34. The first base 10A comprises a first base action portion 17A. When the operating component 50A is rotated with respect to the first base 10A, the second base 30A on the operating component 50A and the first base action portion 17A separate the second bases 30A from the rotating preventing portions 16A of the first base 10A. Preferably, the first base action portion 17A is a bump that has a guiding inclined surface 171A. When the second bases 30A are laterally rotated along with the operating component 50A, the second bases 30A may abut the guiding inclined surface 171A and rotate backward along with the guiding inclined surface 171A, such that the second bases 30A are separated from the two inserting heads 20A. Precisely, the first base action portion 17A is formed on the bottom part 11A of the first base 10A (as shown in FIG. 29), or on an inner surface of the upper lid 12A (as shown in FIG. 34). In this embodiment, each one of the second bases 30A is utilized with two of the first base action portions 17A (i.e. on the bottom part 11A and upper lid 12A), which further prevents the second bases 30A from departing from the two inserting heads 20A.

Figure 23:
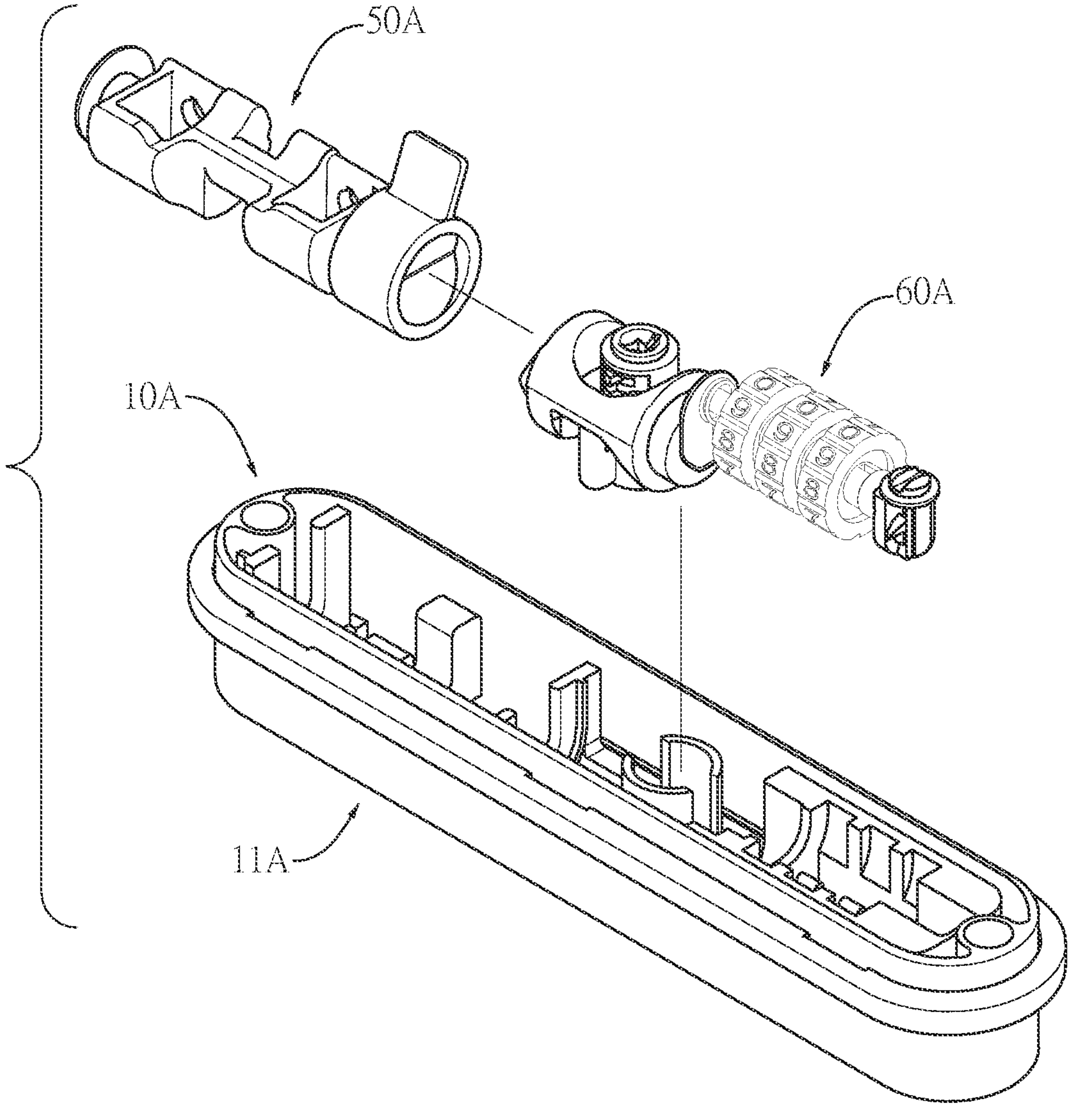

Please refer to FIG. 21 and FIG. 23. The controlling assembly 60A selectively prevents the operating component 50A from being rotated with respect to the first base 10A and thereby prevents the second bases 30A from being rotated backward to depart from the two inserting heads 20A, which also prevents the two inserting heads 20A from entering the disengaging state.

The controlling assembly 60A preferably is a lock of any kind, e.g. a key lock, a combination lock, an electronic lock (with fingerprint recognition for example), etc. Besides, the controlling assembly 60A may be mounted in the first base 10A or an independent lock, e.g. a padlock. In another embodiment, the controlling assembly 60A may not be a lock as long as it can prevent the operating component 50A from being rotated with respect to the first base 10A.

In this embodiment, the controlling assembly 60A is a combination lock and is mounted in the first base 10A. An end of the controlling assembly 60A is mounted through and embedded into the operating component 50A, which prevents the operating component 50A from rotating.

In the first and fourth embodiments, numbers of the insertion holes 13A of the first base 10A, the inserting heads 20A, the second bases 30A, the second components 41A, and the first components 42A are two, but it is not limited thereto. For example, the number of the aforesaid components may be only one, which also achieves the above functions and effects.

Figure 35:
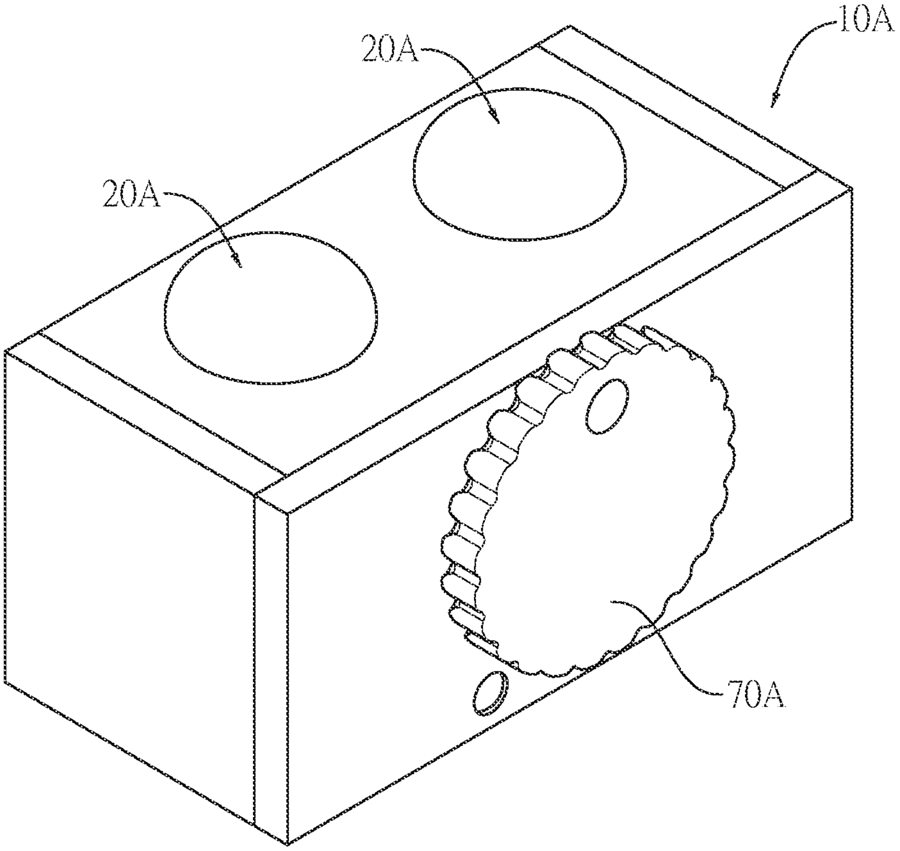
FIG. 35 is a perspective view of a magnetic buckle device in accordance with a fifth embodiment of the present invention.
Figure 36:
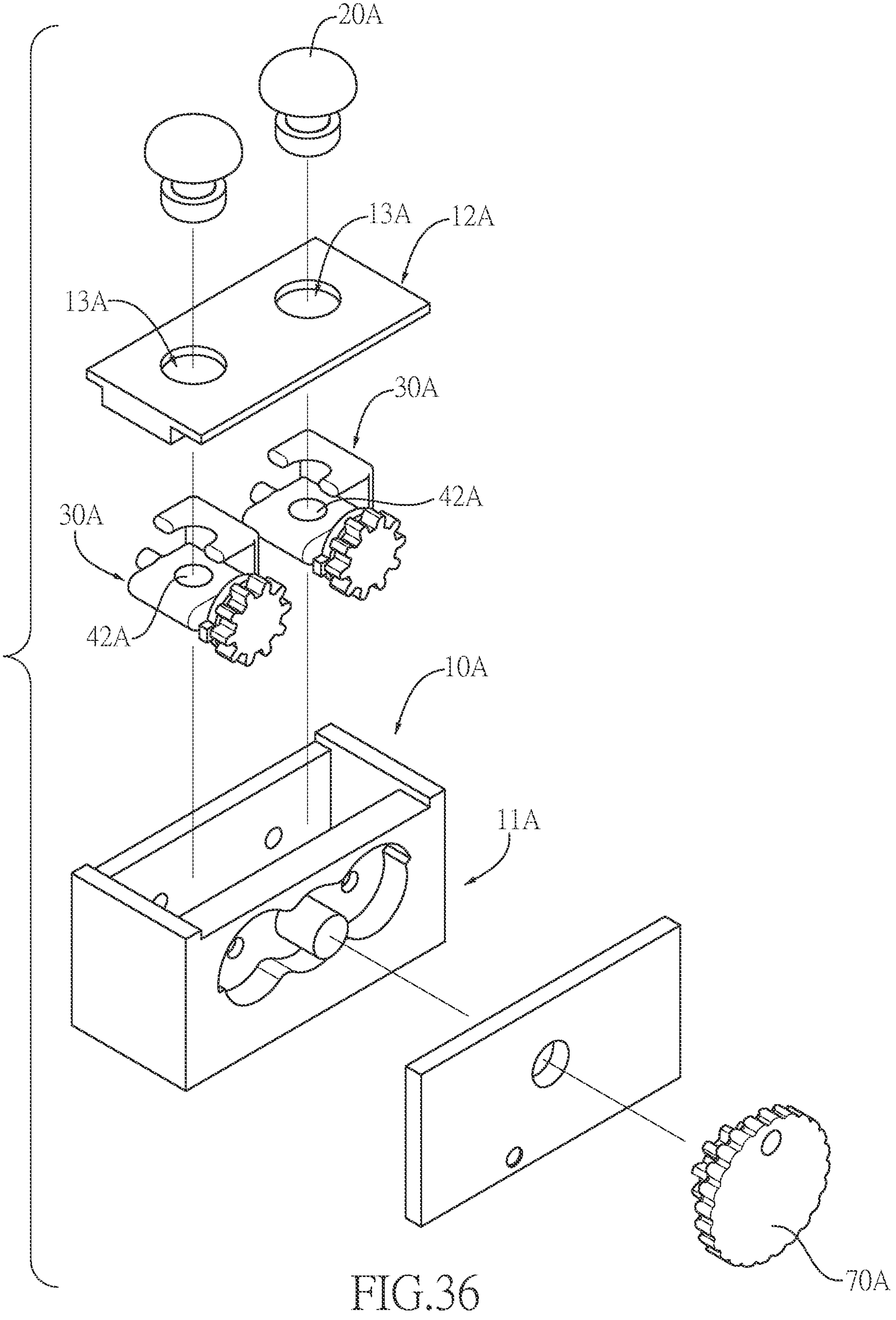
FIG. 36 is an exploded view of the magnetic buckle device in FIG. 35.

Please refer to FIG. 35 to FIG. 37. A fifth embodiment of the present invention, in comparison with the previous two embodiments, does not have the operating component 50A. To unlock, the user may directly rotate the second base 30A. Preferably, the fifth embodiment further comprises a synchronous component 70A. The synchronous component 70A may rotate the two second bases 30A at the same time. Preferably, the synchronous component 70A has a gear to rotate the two second bases 30A synchronously, which provides convenient operation process.

When the fifth embodiment is utilized, after the two inserting heads 20A are inserted into the first base 10A, the second bases 30A will be rotated toward the two inserting heads 20A by the magnetic attraction forces from the first components 42A and the second components 41A, such that the second bases 30A engage with the two inserting heads 20A and thereby the two inserting heads 20A cannot be moved out of the first base 10A, i.e. the two inserting heads 20A enter the engaging state.

During unlocking, the two second bases 30A are rotated by the synchronous component 70A, and then the second bases 30A will depart from the two inserting heads 20A and push the two inserting heads 20A out of the insertion hole 13A of the first base 10A.

In the present invention, the magnetic attraction forces between the second components 41A on the inserting heads 20A and the first components 42A on the second bases 30A provide a guiding effect to assist in inserting the inserting heads 20A. After the inserting heads 20A are inserted at a predetermined position, the magnetic attraction force also assists in keeping the engaging state.

In addition, during unlocking, after the operating component 50A or the synchronous component 70A is rotated, the two inserting heads 20A are unlocked at the same time, or even the two inserting heads 20A are moved out, so the present invention is convenient in use.

Figure 38:
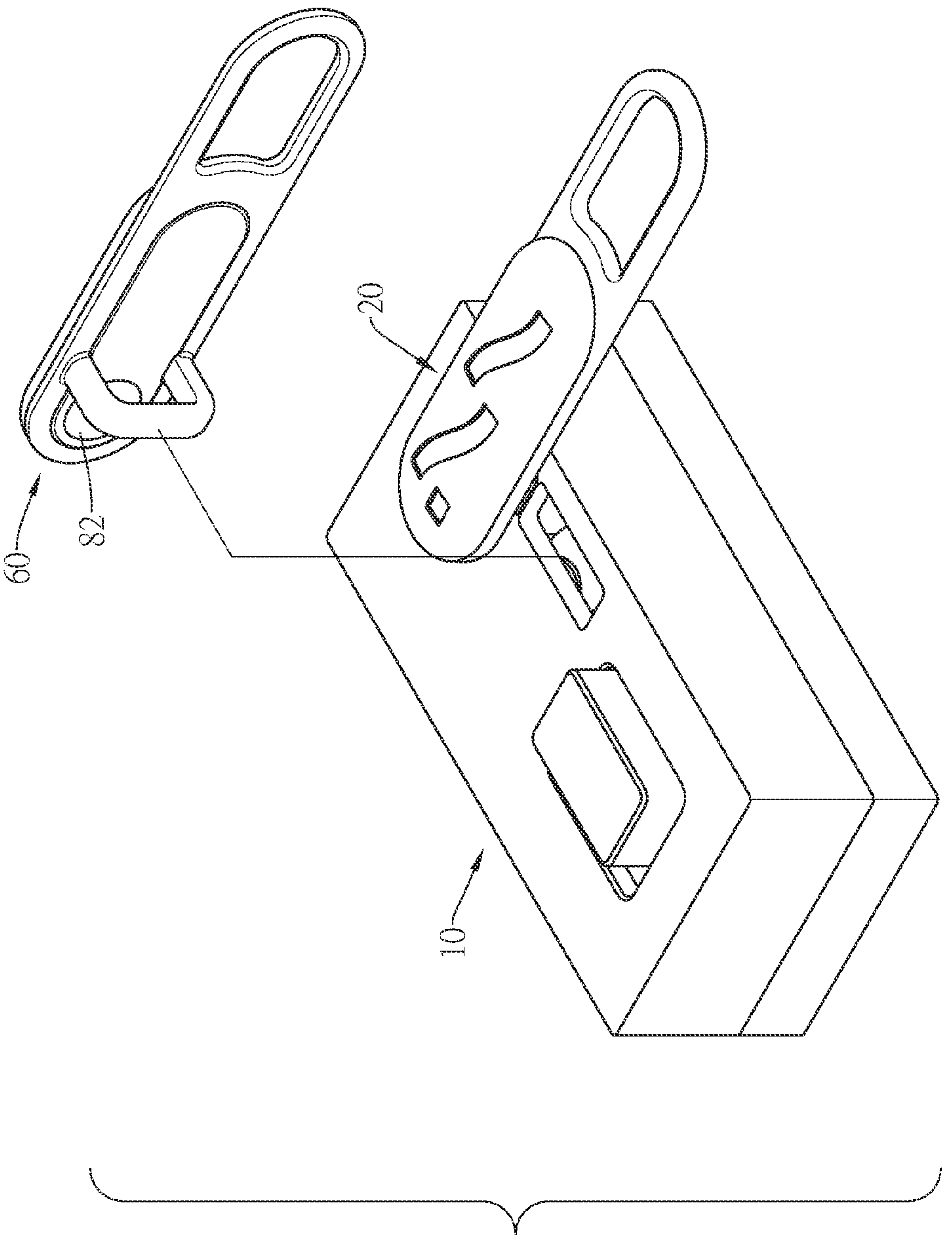
FIG. 38 is a perspective view of a magnetic buckle device in accordance with a fifth embodiment of the present invention.
Figure 39:
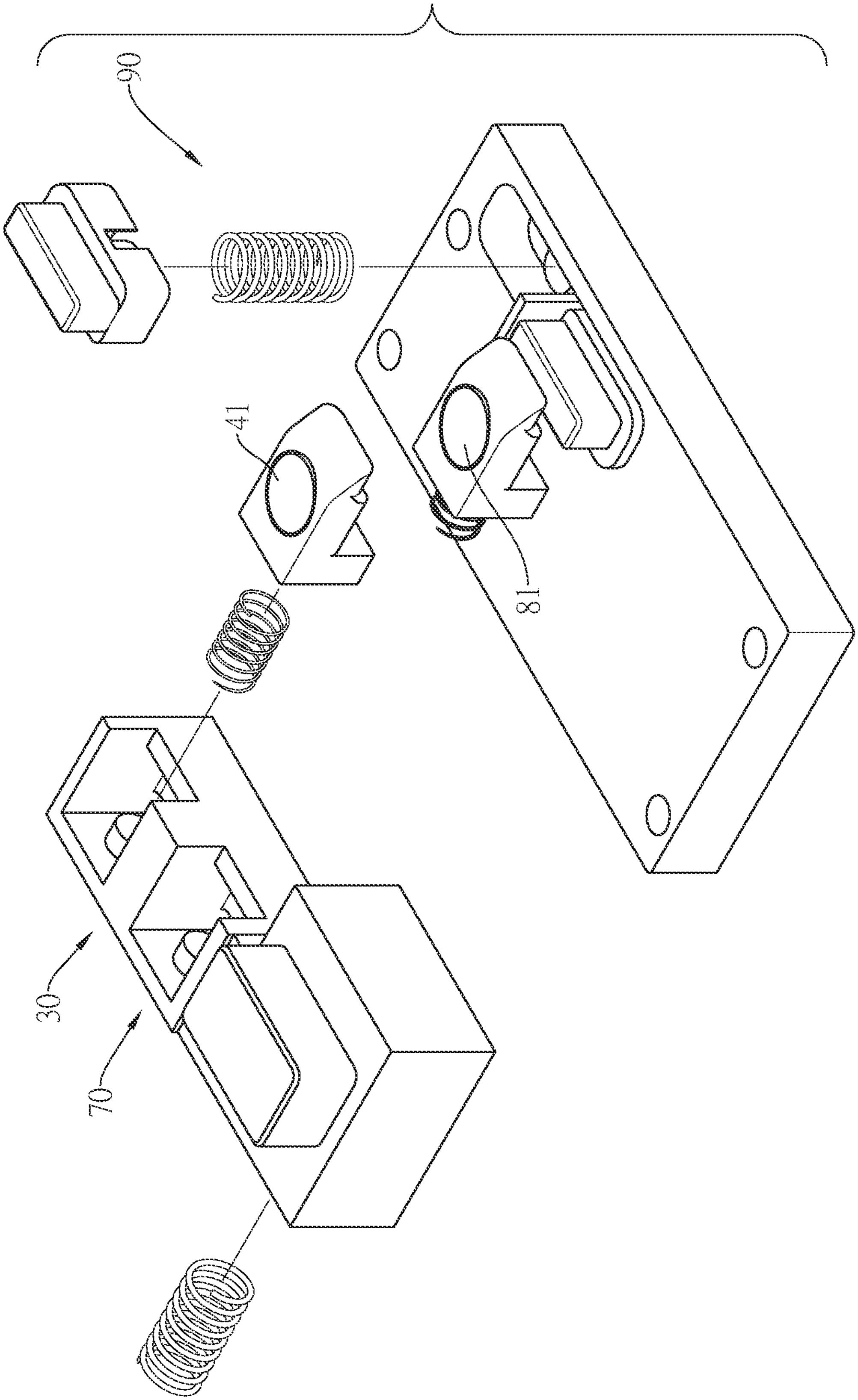
FIG. 39 is an exploded view of the magnetic buckle device in FIG. 38.
Figure 41:
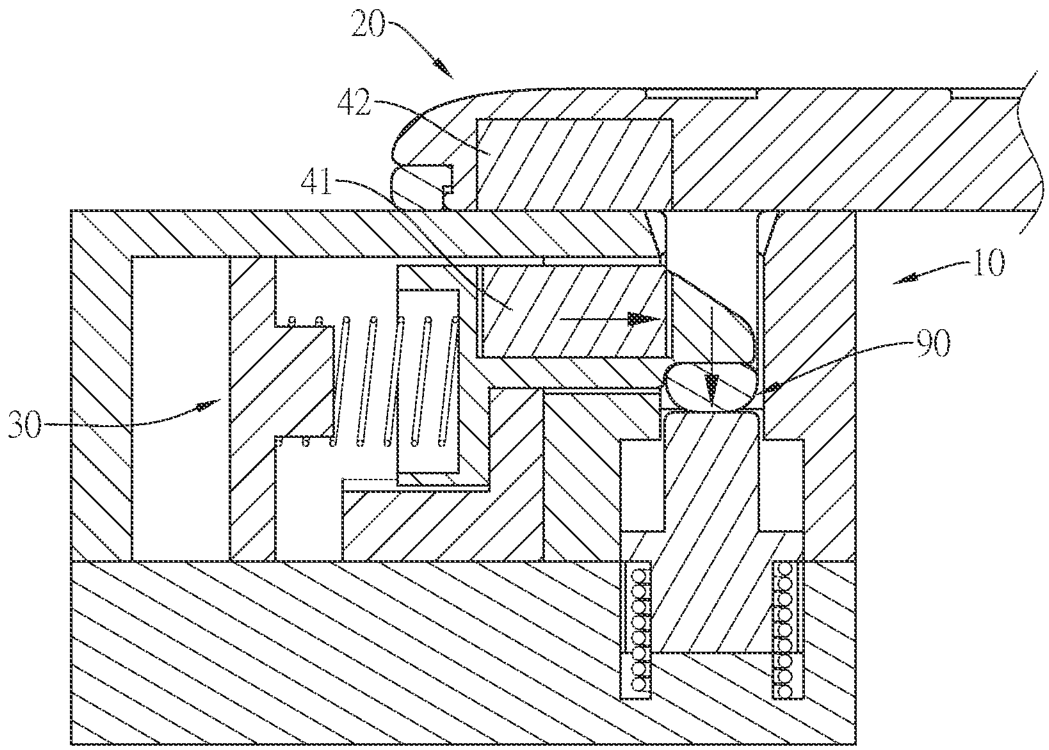

Please refer to FIG. 38, FIG. 39, and FIG. 41. The sixth embodiment of the present invention comprises a first base 10, a major inserting head 20, a second major base 30, a first major component 41, a second major component 42, and a disengaging assembly 90.

Figure 42:
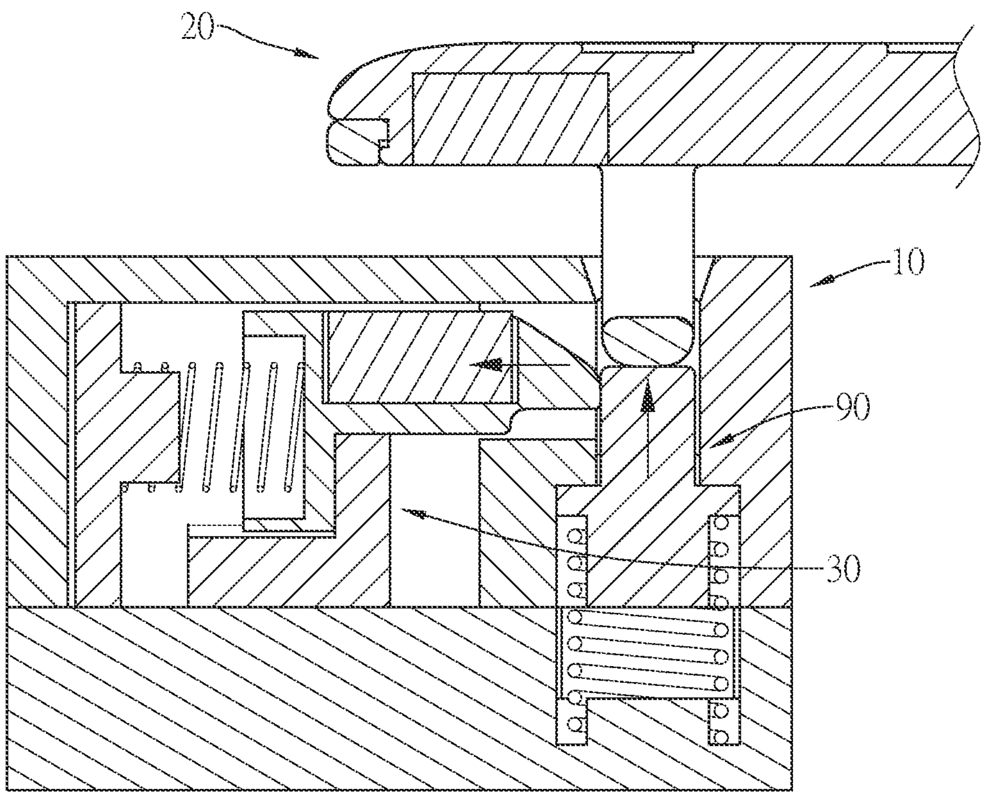
Figure 43:
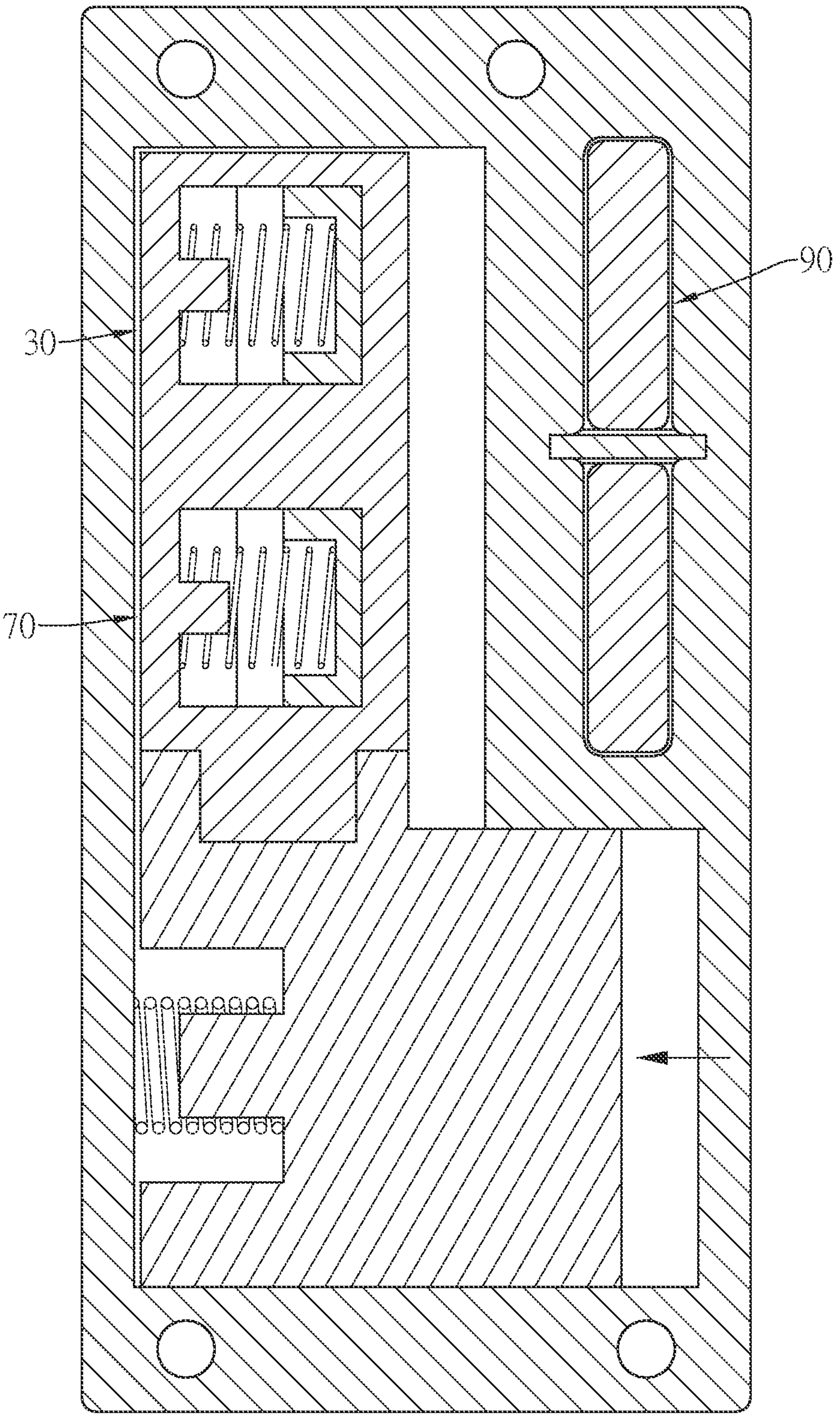
FIG. 43 is a top, sectional, and operational view of the magnetic buckle device in FIG. 38.

Please refer to FIG. 41 to FIG. 43. When the first base 10 and the second major base 30 are moved or rotated with respect to each other such that the major inserting head 20 enters the disengaging state, the disengaging assembly 90 moves the major inserting head 20 out of the first base 10. In this embodiment, the disengaging assembly 90 comprises an elastic component. The disengaging assembly 90 directly moves the major inserting head 20, but it is not limited thereto. In another embodiment, the disengaging assembly 90 may not contact the major inserting head 20, but for example, provide the magnetic repulsion force to move the major inserting head 20. Besides, in another embodiment, the disengaging assembly 90 may push the major inserting head 20 fully out of the first base 10.

Figure 40:
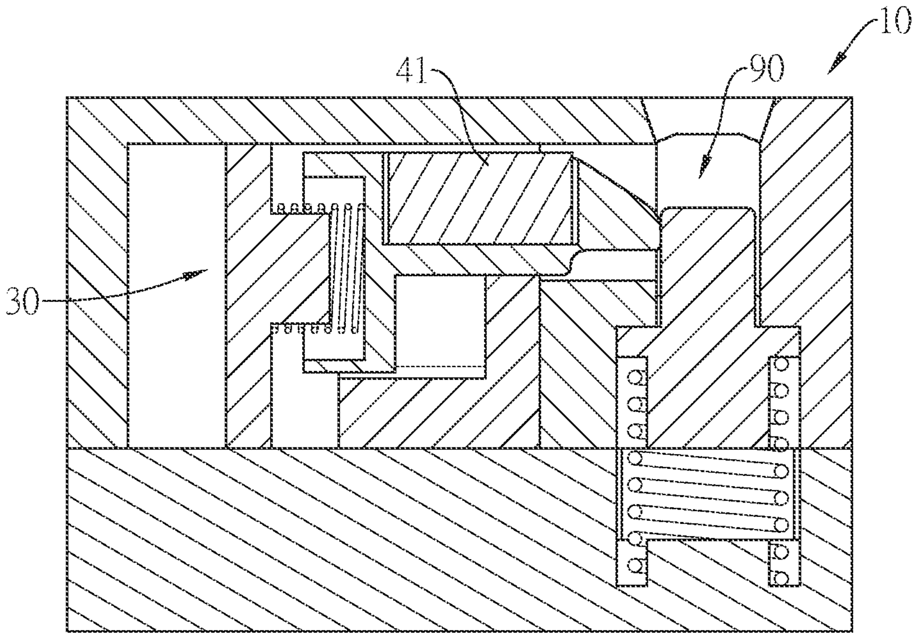
FIGS. 40 to 42 are lateral, sectional, and operational views of the magnetic buckle device in FIG. 38.

Please refer to FIG. 40 and FIG. 41. In this embodiment, when the major inserting head 20 is inserted into the first base 10 such that the major inserting head 20 enters the engaging state, the major inserting head 20 is capable of affecting the disengaging assembly 90 and thereby the disengaging assembly 90 tends to move the major inserting head 20 out of the first base 10.

Besides, the sixth embodiment preferably further comprises a minor inserting head 60, a second minor base 70, a first minor component 81, and a second minor component 82. The functions thereof are similar to those in the previous embodiments so detailed description is omitted hereinafter. Moreover, the second minor base 70 is connected to the second major base 30 and preferably both are integrated into one component.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic buckle device comprising:

a first base;

a major inserting head configured to be inserted into the first base along a major engaging direction such that the major inserting head enters an engaging state;

a second major base, the first base and the second major base being capable of moving or rotating with respect to each other to make the major inserting head enter a disengaging state;

a first major component mounted on the second major base;

a second major component mounted on the major inserting head; wherein when the major inserting head is inserted into the first base along the major engaging direction, a magnetic attraction force is generated between the first major component and the second major component to assist in keeping the major inserting head in the engaging state;

wherein the second major base is rotatable with respect to the first base forward to make the major inserting head enter the engaging state and backward to make the major inserting head change to the disengaging state;

wherein when the major inserting head is inserted into the first base along the major engaging direction, the magnetic attraction force between the first major component and the second major component rotates the second major base to make the major inserting head enter the engaging state;

an operating component being rotatable with respect to the first base, the second major base rotatably mounted on the operating component;

wherein when the major inserting head is in the engaging state, after the operating component is rotated with respect to the first base, the second major base departs from the major inserting head such that the major inserting head enters the disengaging state.

2. The magnetic buckle device as claimed in claim 1, wherein:

the first base is a shell;

the magnetic buckle device further comprises:

a controlling assembly selectively preventing the second major base and the first base from rotating with respect to each other, thereby preventing the major inserting head from entering the disengaging state.

3. The magnetic buckle as claimed in claim 2, wherein the second major base is movably mounted in the first base and the second major base is capable of moving with respect to the first base along a major disengaging direction to make the major inserting head enter the disengaging state; the major disengaging direction differs from the major engaging direction; the controlling assembly selectively prevents the second major base from moving with respect to the first base along the major disengaging direction, thereby preventing the major inserting head from entering the disengaging state.

4. The magnetic buckle device as claimed in claim 3 comprising: a minor inserting head configured to be inserted into the first base along a minor engaging direction such that the minor inserting head entering an engaging state; a second minor base, the second minor base and the first base being capable of moving or rotating with respect to each other to make the minor inserting head enter a disengaging state; a first minor component mounted on the second minor base; a second minor component mounted on the minor inserting head; wherein when the minor inserting head is inserted into the first base along the minor engaging direction, a magnetic attraction force is generated between the first minor component and the second minor component to assist in keeping the minor inserting head in the engaging state; wherein the first base and the second major base are capable of moving or rotating with respect to each other, which causes not only the major inserting head to enter the disengaging state but also make the second minor base and the first base move or rotate with respect to each other thereby the minor inserting head entering the disengaging state; wherein the second minor base is movably mounted in the first base and is capable of moving with respect to the first base along a minor disengaging direction to make the minor inserting head enter the disengaging state; the minor disengaging direction differs from the minor engaging direction.

5. The magnetic buckle device as claimed in claim 4, wherein the second major base comprises a major base body; and a major displacement component, the major displacement component movably mounted in the major base body; the first major component mounted on the major displacement component; when the major inserting head is inserted into the first base along the major engaging direction, the magnetic attraction force between the first major component and the second major component moves the major displacement component to engage with the major inserting head such that the major inserting head enters the engaging state; the second minor base comprises: a minor base body; and a minor displacement component movably mounted in the minor base body; the first minor component mounted on the minor displacement component; when the minor inserting head is inserted into the first base along the minor engaging direction, the magnetic attraction force between the first minor component and the second minor component moves the minor displacement component to engage with the minor inserting head such that the minor inserting head enters the engaging state.

6. The magnetic buckle device as claimed in claim 4, wherein when the second major base is moved along the major disengaging direction, a force is generated toward a direction opposite the major engaging direction to resist the magnetic attraction force between the first major component and the second major component, such that a side of the major inserting head is tilted and an angle between the first major component and the second major component is changed and thereby the major inserting head departs from the first base; said side is a side of the major inserting head that is opposite the major disengaging direction; when the second minor base is moved along the minor disengaging direction, a force is generated toward a direction opposite the minor engaging direction to resist the magnetic attraction force between the first minor component and the second minor component, such that a side of the minor inserting head is tilted and an angle between the first minor component and the second minor component is changed and thereby the minor inserting head departs from the first base; said side is a side of the minor inserting head that is opposite the minor disengaging direction.

7. The magnetic buckle device as claimed in claim 1, wherein when the second major base rotates backward with respect to the first base so the major inserting head changes to the disengaging state, then the second major base pushes the major inserting head out of the first base.

8. The magnetic buckle device as claimed in claim 1, wherein:

- the first base comprises:
  - a major block portion;
- the second major base comprises:
  - a second major base action portion;
- the major inserting head comprises:
  - a major inserting head action portion; and
- when the major inserting head is inserted into the first base, the second major base is rotated such that the second major base action portion and the major inserting head action portion cooperate with each other to make the major inserting head enter the engaging state; meanwhile, the major block portion abuts the second major base such that the major inserting head is kept in the engaging state;
- when the operating component is rotated with respect to the first base, the second major base on the operating component departs from the major block portion, and the second major base action portion and the major inserting head action portion cooperate with each other to make the second major base rotate backward and thereby depart from the major inserting head.

9. The magnetic buckle device as claimed in claim 8, wherein the second major base action portion is a bump having an inclined and round surface and the major inserting head action portion is a groove having an inclined and round surface.

10. The magnetic buckle device as claimed in claim 1, wherein: the first base comprises a first base action portion; and a rotating preventing portion; and when the major inserting head is inserted into the first base and after the second major base is rotated, the rotating preventing portion of the first base abuts the second major base such that the major inserting head is kept in the engaging state; when the operating component is rotated with respect to the first base, the second major base on the operating component and the first base action portion cooperate with each other such that the second major base departs from the rotating preventing portion of the first base.

11. The magnetic buckle device as claimed in claim 1, wherein when the operating component is rotated with respect to the first base, the operating component pushes the major inserting head out of the first base.

12. The magnetic buckle device as claimed in claim 1, comprising:

- a minor inserting head configured to be inserted into the first base along a minor engaging direction such that the minor inserting head enters an engaging state;
- a second minor base being rotatable with respect to the first base forward to make the minor inserting head enter the engaging state and backward to make the minor inserting head change to a disengaging state;
- a first minor component mounted on the second minor base;
- a second minor component mounted on the minor inserting head; wherein when the minor inserting head is inserted into the first base along the minor engaging direction, a magnetic attraction force is generated between the first minor component and the second minor component to assist in keeping the minor inserting head in the engaging state.

13. The magnetic buckle device as claimed in claim 12 comprising:

- an operating component which is rotatable with respect to the first base to make the second major base and the second minor base rotate with respect to the first base for making the major inserting head and the minor inserting head enter the disengaging state.

14. The magnetic buckle device as claimed in claim 1 comprising: a disengaging assembly; when the first base and the second major base moving or rotating with respect to each other to make the major inserting head enter the disengaging state, the disengaging assembly being capable of driving the major inserting head to move along a direction away from the first base.

* * * * *